US012134285B2

(12) United States Patent
Iwashita et al.

(10) Patent No.: US 12,134,285 B2
(45) Date of Patent: Nov. 5, 2024

(54) TIRE

(71) Applicant: Sumitomo Rubber Industries, Ltd., Kobe (JP)

(72) Inventors: Takeru Iwashita, Kobe (JP); Ryotaro Kitahara, Kobe (JP); Hiroshi Yamaoka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/849,920

(22) Filed: Jun. 27, 2022

(65) Prior Publication Data

US 2023/0023697 A1 Jan. 26, 2023

(30) Foreign Application Priority Data

Jul. 19, 2021 (JP) ................................ 2021-118946
Jul. 19, 2021 (JP) ................................ 2021-118947

(51) Int. Cl.

*B60C 11/13* (2006.01)
*B60C 11/03* (2006.01)
*B60C 11/12* (2006.01)

(52) U.S. Cl.

CPC ...... *B60C 11/1384* (2013.01); *B60C 11/0309* (2013.01); *B60C 11/1307* (2013.01); (Continued)

(58) Field of Classification Search

CPC ............. B60C 11/1384; B60C 11/1392; B60C 11/1376; B60C 11/0306; B60C 11/0304; B60C 11/03

See application file for complete search history.

(56) References Cited

U.S. PATENT DOCUMENTS

2005/0072505 A1* 4/2005 Takahashi ............... B60C 11/13 152/209.15
2005/0217775 A1* 10/2005 Metz ....................... B60C 11/13 152/209.21
2016/0193884 A1* 7/2016 Takemoto ........... B60C 11/1392 152/209.1

FOREIGN PATENT DOCUMENTS

DE 102014213660 A1 * 1/2016 ......... B60C 11/0304
EP 3 015 288 A1 5/2016

(Continued)

OTHER PUBLICATIONS

Extended European Search Report for European Application No. 22181181.3, dated Nov. 25, 2022.

*Primary Examiner* — Cedrick S Williams
*Assistant Examiner* — Thomas Frank Schneider
(74) *Attorney, Agent, or Firm* — Birch, Stewart, Kolasch & Birch, LLP

(57) ABSTRACT

A tire comprises a tread portion comprising a circumferentially arranged blocks divided by lateral grooves. Each block has a block side wall and a block tread. Each lateral groove comprises an axially outer first portion, an axially inner second portion, and a connect portion at which the first portion and the second portion are connected with each other so that each block is provided with a convex corner portion which is convex toward the outside of the block at the connect portion. In the convex corner portion, the block side wall comprises a first side wall extending along the first portion, a second side wall extending along the second portion, and a substantially triangular third side wall intersecting the first side wall, the second side wall and the block tread. The third side wall terminates radially outside the groove bottom of the lateral groove.

7 Claims, 17 Drawing Sheets

(52) U.S. Cl.
CPC ................. *B60C 2011/0365* (2013.01); *B60C 2011/0372* (2013.01); *B60C 11/1204* (2013.01); *B60C 2011/1213* (2013.01)

(56) References Cited

FOREIGN PATENT DOCUMENTS

| | | | | |
|---|---|---|---|---|
| EP | 3 189 981 | A1 | | 7/2017 |
| EP | 3 505 389 | A1 | | 7/2019 |
| JP | H026204 | A | * | 1/1990 |
| JP | 05254311 | A | * | 10/1993 |
| JP | H0747808 | A | * | 2/1995 |
| JP | H11227420 | A | * | 8/1999 |
| JP | 2018-79903 | A | | 5/2018 |
| KR | 20020003658 | A | * | 1/2002 |

* cited by examiner

TIRE

TECHNICAL FIELD

The present disclosure relates to a tire, more particularly to a tread pattern.

BACKGROUND ART

The following Patent Document 1 discloses a pneumatic tire, wherein, in order to improve steering stability on wet roads while securing steering stability on dry roads, the tread portion is divided into an outboard shoulder land region and an outboard second land region which are positioned on the axially outside and inside, respectively, of an outboard outermost circumferential main groove, and an inboard shoulder land region and an inboard second land region which are positioned on the axially outside and inside, respectively, of an inboard outermost circumferential main groove. Then, the tread portion is provided with lateral grooves extending continuously from the outboard shoulder land region to the inboard second land region across the tire equator and terminated within the inboard second land region, and the inboard second land region is provided with sub grooves passing the terminated ends of the lateral grooves and separated from the inboard axially outermost circumferential main groove.

Patent Document 1: Japanese Patent Application Publication No. 2018-079903

SUMMARY OF THE INVENTION

Problems to be Solved by the Invention

In recent years, further improvement in wet performance and snow performance is desired. On the other hand, it is also required to suppress the deterioration of steering stability performance.

The present disclosure was made in view of the above circumstances, and a primary objective of the present disclosure is to provide a tire in which wet performance and snow performance can be improved while suppressing deterioration of steering stability performance.

Means for Solving the Problems

According to one aspect of the present disclosure, a tire comprises:

a tread portion comprising a middle land region defined between a middle circumferential groove and an axially outer shoulder circumferential groove, the middle land region circumferentially divided by middle lateral grooves into a plurality of middle blocks each having a block side wall and a block tread, and each of the middle lateral grooves comprising a first portion extending from the shoulder circumferential groove, a second portion located on the middle circumferential groove side and inclined with respect to the first portion, and a connect portion at which the first portion and the second portion are connected with each other, so that each of the middle blocks is provided with a convex corner portion which is convex toward the outside of the block at the connect portion, wherein in the convex corner portion, the block side wall comprises a first side wall extending along the first portion, a second side wall extending along the second portion, and a substantially triangular third side wall intersecting the first side wall, the second side wall and the block tread, and the third side wall terminates on the outside in the tire radial direction, of the groove bottom of the middle lateral groove.

DETAILED DESCRIPTION OF THE INVENTION

Figure 1:
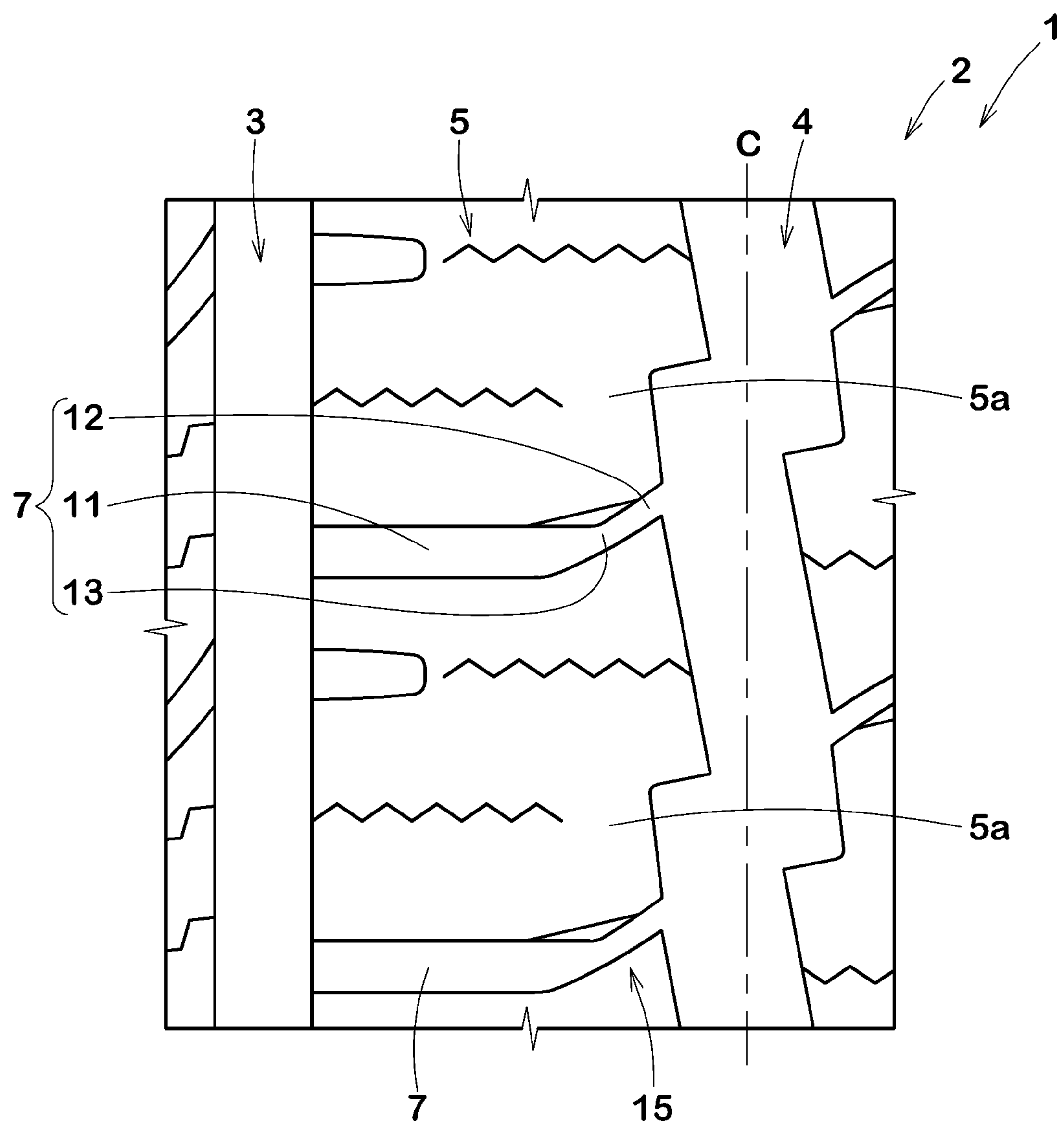
FIG. 1 is a plan view of a part of the tread portion of a tire according to a first mode for carrying out the present disclosure.

The present disclosure is suitably applied to pneumatic tires for commercial vehicles, light trucks and the like used in the winter season or all seasons. However, the present disclosure can be applied to pneumatic tires for heavy duty vehicles, passenger cars and the like, as well as non-pneumatic tires so called airless tires.

Hereinafter, taking a pneumatic tire as an example, embodiments of the present disclosure will be described with reference to the accompanying drawings.

As well known in the art, a pneumatic tire comprises a tread portion 2 whose radially outer surface defines the tread, a pair of axially spaced bead portions mounted on rim seats, a pair of sidewall portions extending between the tread edges Te and the bead portions, a carcass extending between the bead portions through the tread portion and the sidewall portions, and a tread reinforcing belt disposed radially outside the carcass in the tread portion.

The tread edges Te are the axial outermost edges of the ground contacting patch of the tire which occurs under its normally loaded condition when the camber angle of the tire is zero.

In the case of a pneumatic tire, the normally loaded condition is such that the tire is mounted on a standard wheel rim and inflated to a standard pressure and loaded with a standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like.

The standard pressure is the "maximum air pressure" in JATMA, the "Inflation Pressure" in ETRTO, the maximum pressure given in the "Tire Load Limits at Various Cold Inflation Pressures" table in TRA or the like.

The standard load is the "maximum load capacity" in JATMA, the "Load Capacity" in ETRTO, the maximum value given in the above-mentioned table in TRA or the like.

The after-mentioned tread width TW is the width measured under a normally inflated unloaded condition, as the axial distance between the tread edges Te determined as above.

The normally inflated unloaded condition is such that the tire is mounted on the standard wheel rim and inflate to the standard pressure but loaded with no tire load.

In this application including specification and claims, various dimensions, positions and the like of the tire refer to those under the normally inflated unloaded condition of the tire unless otherwise noted.

<First Mode>

Hereinafter, a first mode for carrying out the present disclosure will be descried in detail.

FIG. 1 is a plan view of a part of the tread portion 2 of a tire 1 according to the first mode.

As shown in FIG. 1, the tread portion 2 according to the first mode is provided with a shoulder circumferential groove 3 and a middle circumferential groove 4 which extend continuously in the tire circumferential direction so as to define a middle land region 5 therebetween.

During straight running and during cornering, the middle land region 5 is subjected to a relatively large contact pressure and has a large influence on the steering stability performance, wet performance, and snow performance.

The first mode is intended to improve these performances focusing on the middle land region 5.

The middle land region 5 according to the first mode is provided with a plurality of middle lateral grooves 7, and is circumferentially divided into a plurality of middle blocks 5*a*.

Each of the middle lateral grooves 7 has a first portion 11 extending from the shoulder circumferential groove 3, a second portion 12 disposed on the middle circumferential groove 4 side and inclined with respect to the first portion 11, and a connect portion 13 in which 12 the first portion 11 and the second portion are connected with each other.

Such middle lateral groove 7 provides edge components in multiple directions, therefore, wet performance and snow performance are improved.

Due to such bent middle lateral groove 7, the middle block 5*a* is provided, in the connect portion 13, with a convex corner portion 15 which is convex to the outside of the block.

Figure 2:
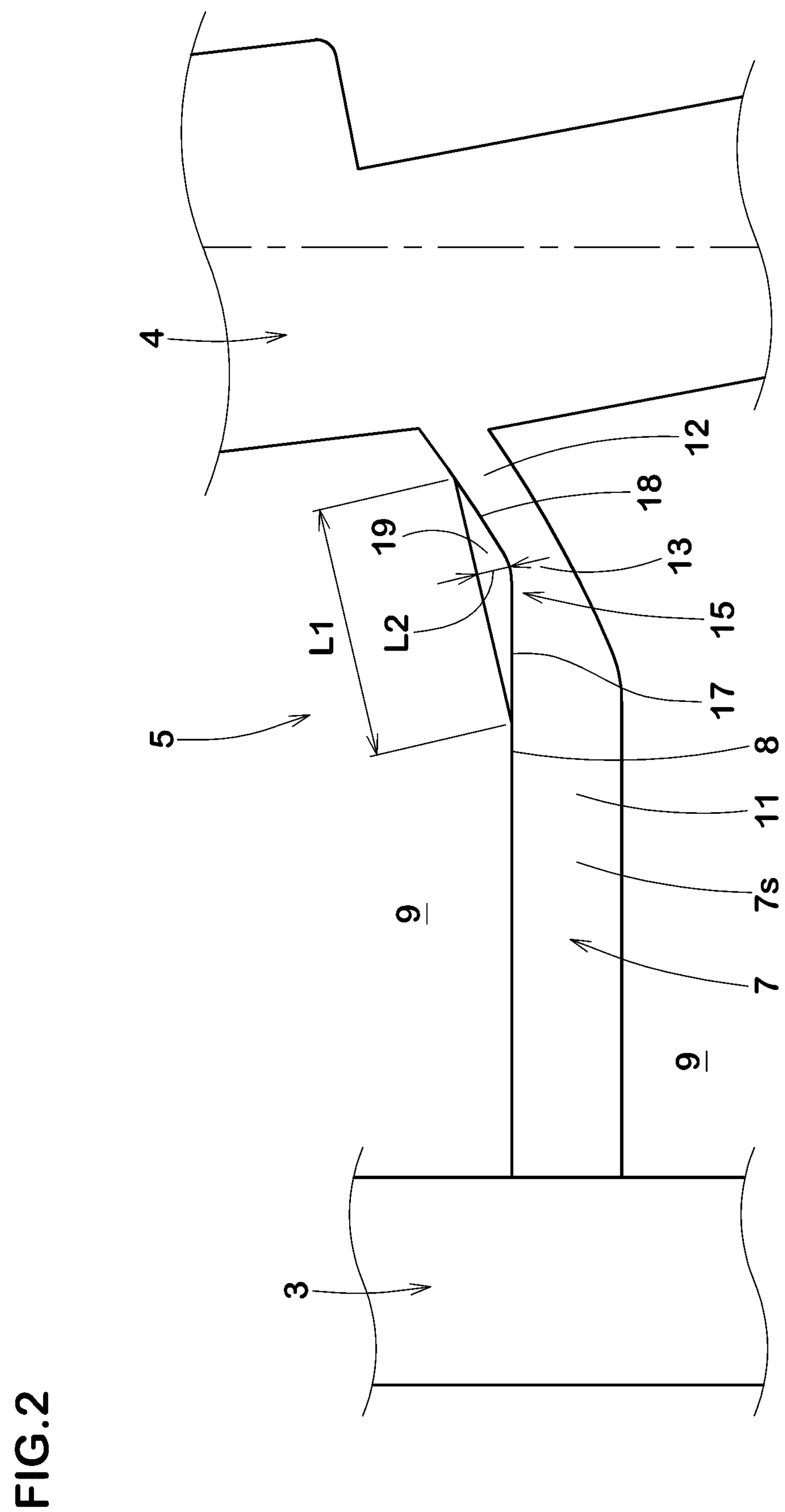
FIG. 2 is an enlarged view showing a middle lateral groove shown in FIG. 1.

FIG. 2 is an enlarged view of the middle lateral groove 7 shown in FIG. 1 and the surrounding part thereof.

Figure 3:
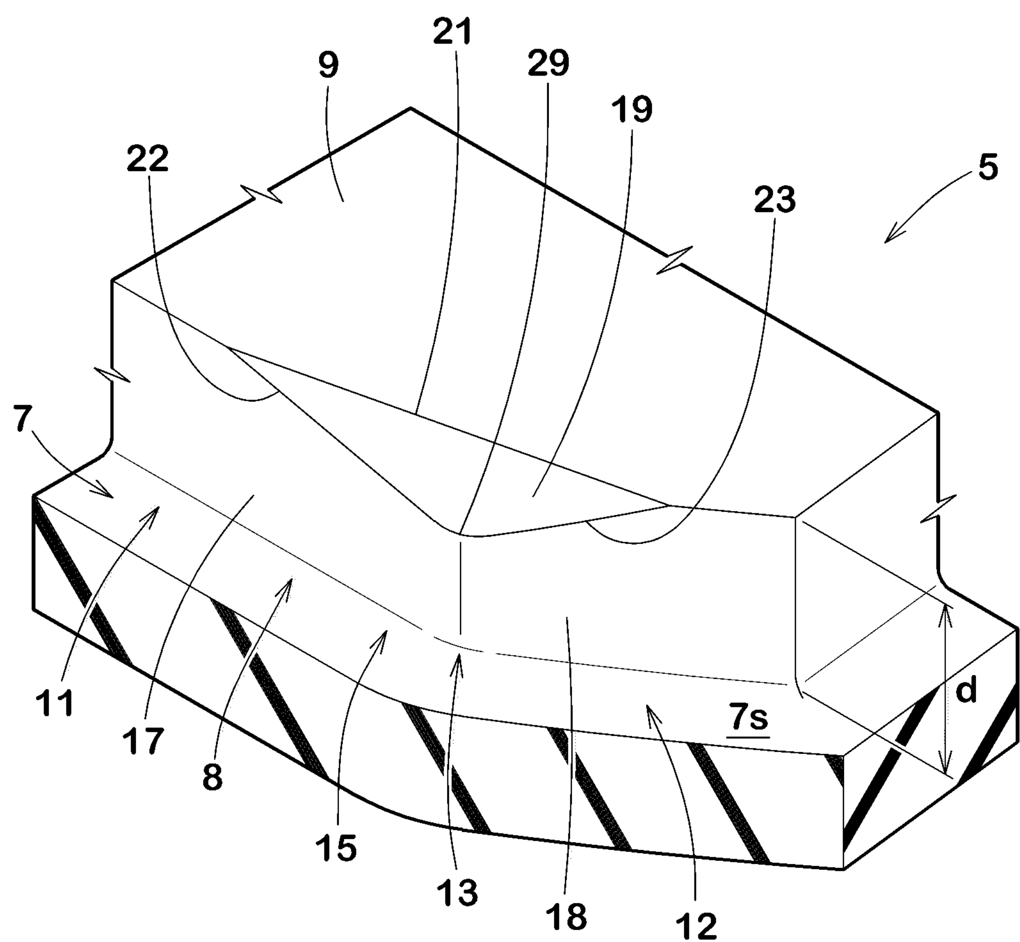
FIG. 3 is a perspective view showing a convex corner portion shown in FIG. 1.

FIG. 3 is a perspective view of a part of the middle block 5*a* shown in FIG. 1 showing the convex corner portion 15 thereof.

As shown in FIGS. 2 and 3, the middle block's side wall 8 in the convex corner portion 15 (hereinafter, the "first lateral side wall" 8*a*) includes a first side wall 17, a second side wall 18, and a third side wall 19.

The first side wall 17 extends along the first portion 11.

The second side wall 18 extends along the second portion 12.

The third side wall 19 has a substantially triangular shape and intersects the first side wall 17, the second side wall 18, and the middle block's tread 9. Such third side wall 19 increases the groove volume in the connect portion 13 which usually has a large drainage resistance and is easily clogged by snow, and thereby facilitates drainage in the connect portion 13 and snow ejection therefrom. Therefore, wet performance and snow performance are improved.

The radially innermost end of the third side wall 19 is located radially outside the groove bottom 7*s* of the middle lateral groove 7.

In other words, the third side wall 19 does not reach the groove bottom 7*s*. As a result, the decrease in the rigidity of the middle block 5*a* is suppressed, and the deterioration of the steering stability performance is suppressed.

Figure 4:
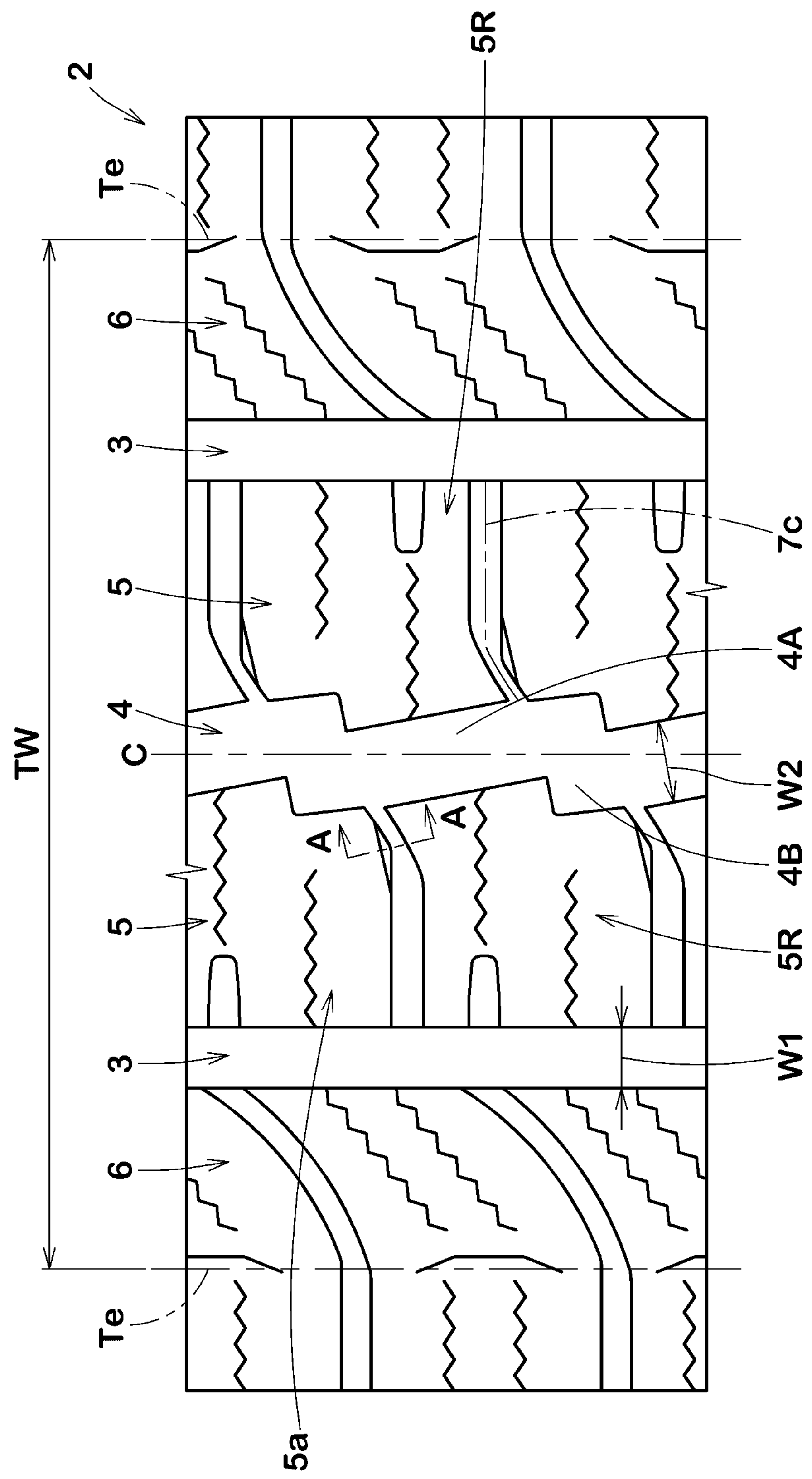
FIG. 4 is a plan view of a part of the tread portion of the tire according to the first mode.

FIG. 4 is a plan view of a part of the tread portion 2.

In the first mode, as shown in FIG. 4, the shoulder circumferential groove 3 is disposed on each side of the tire equator C, and the middle circumferential groove 4 is disposed between the two shoulder circumferential grooves 3. Thereby, the above-mentioned middle land region 5 is formed on both sides of the middle circumferential groove 4. And a shoulder land region 6 is formed between each of the shoulder circumferential grooves 3 and the adjacent tread edge Te.

The tread portion 2 is axially divided into a pair of the middle land regions 5 and a pair of the shoulder land regions 6.

However, the present disclosure is not limited to such embodiment.

For example, the tread portion 2 may be provided with two shoulder circumferential grooves 3 and two middle circumferential grooves 4 so as to form two shoulder land regions 6, two middle land regions 5, and one crown land region (not shown) between the two middle circumferential grooves 4.

In the first mode, each shoulder circumferential groove 3 extends continuously in the tire circumferential direction. The shoulder circumferential groove 3 in this example extends straight along the tire circumferential direction in order to improve drainage performance.

In the first mode, the middle circumferential groove 4 extends continuously in the tire circumferential direction. The middle circumferential groove 4 in this example extends in a zigzag shape.

Such middle circumferential grooves 4 can exert a large shearing force with respect to compacted snow blocks, and can improve snow performance.

The middle circumferential groove 4 is made up of alternately arranged less inclined portions 4A and largely inclined portions 4B.

The less inclined portion 4A is inclined with respect to the tire circumferential direction at a small angle. The largely inclined portion 4B is inclined with respect to the tire circumferential direction at a larger angle than that of the less inclined portion 4A.

The middle circumferential groove 4 is disposed on the tire equator C.

However, according to the present disclosure, the middle circumferential groove 4 and the shoulder circumferential groove 3 are not limited to such configurations. For example, each circumferential groove 3, 4 may be formed as a straight groove, a zigzag groove, or a wavy groove.

It is desirable that the groove width W2 of the middle circumferential groove 4 is larger than the groove width W1 of the shoulder circumferential groove 3. Thereby, effective drainage can be ensured in the vicinity of the tire equator C in which drainage is usually relatively difficult.

Although not particularly limited, it is preferable that the groove width W2 of the middle circumferential groove 4 is not less than 1.1 times, more preferably not less than 1.2 times, but not more than 1.5 times, more preferably not more than 1.4 times the groove width W1 of the shoulder circumferential groove 3. Further, it is preferable that the groove width W2 of the middle circumferential groove 4 is not less than 3.0%, more preferably not less than 4.0%, but not more than 8.0%, more preferably not more than 7.0% of the tread width TW. Here, the groove width W2 is measured at the less inclined portion 4A of the middle circumferential groove 4.

Figure 5:
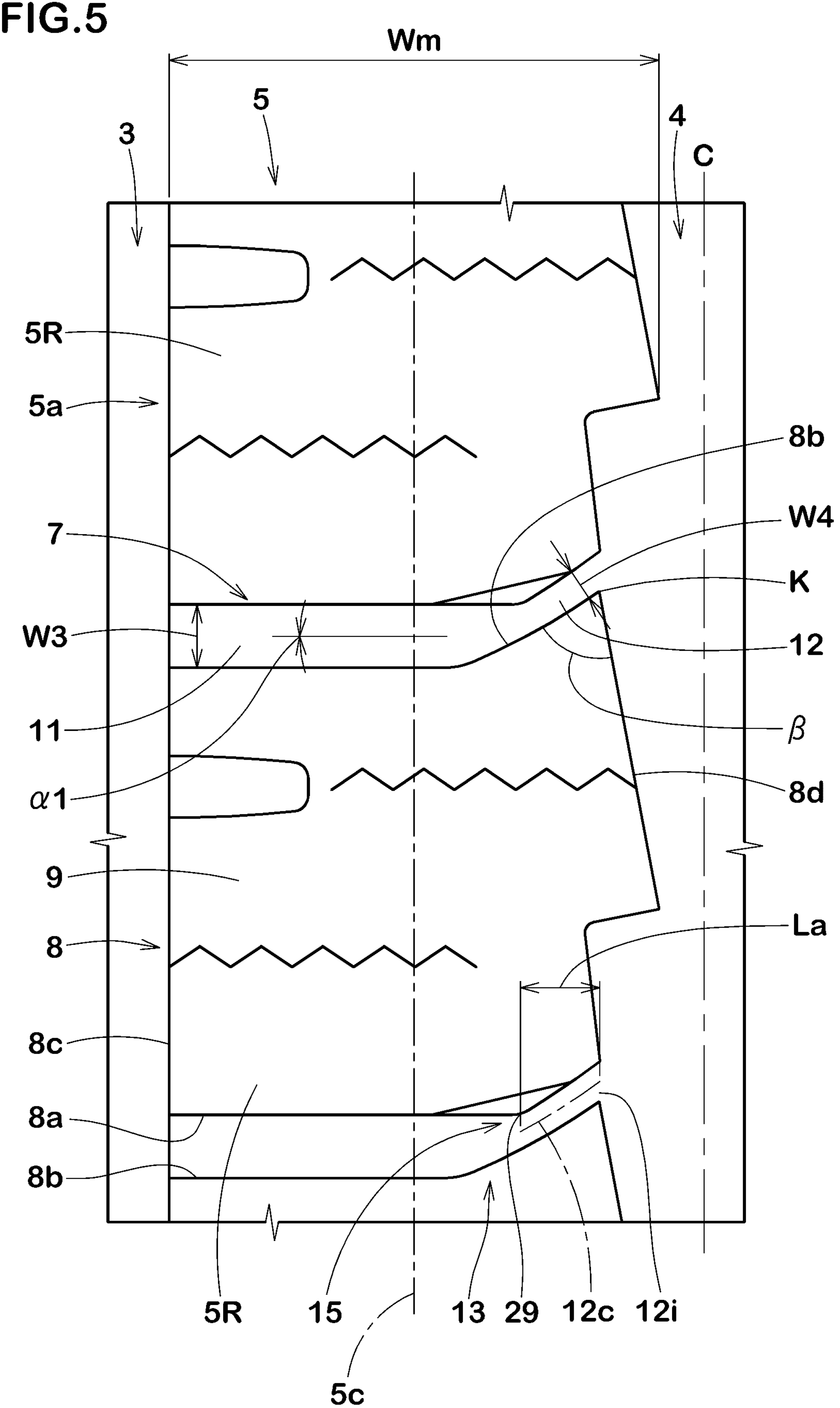
FIG. 5 is a plan view of a part of the middle land region of the tire according to the first mode.

FIG. 5 is a plan view of a part of the middle land region 5 showing the middle block 5*a*. As shown in FIG. 5, the middle block 5*a* has a tread 9 or ground contacting surface, and a side wall 8 extending radially inwardly from the peripheral edge of the tread 9.

The side wall 8 is formed by the groove walls of the surrounding grooves 3, 4 and 7.

In the first mode, the middle block side wall 8 includes a first lateral side wall 8*a* forming the convex corner portion 15, a second lateral side wall 8*b* facing the first lateral side wall 8*a* of the next middle block, a first longitudinal side wall 8*c* forming a part of the groove walls of the shoulder circumferential groove 3, and a second longitudinal side wall 8*d* forming a part of the groove walls of the middle circumferential groove 4.

The middle lateral groove 7 is formed between the first lateral side wall 8*a* and the second lateral side wall 8*b*.

The first lateral side wall 8*a* includes the above-said first side wall 17, second side wall 18 and third side wall 19.

In the first mode, the first portion 11 of the middle lateral groove 7 extends straight. Such first portions 11 maintain high rigidity of the middle land region 5.

The angle α1 of the first portion 11 with respect to the tire axial direction is preferably not more than 20 degrees. Thereby, great traction can be exhibited when running on snowy roads.

In this example, the angle α1 of the first portion 11 is 0 degrees in the middle position 5*c* in the tire axial direction of the middle land region 5.

Here, the middle position 5*c* means a position where the maximum width Wm in the tire axial direction of the middle land region 5 is bisected in the tire axial direction. Further, the above-mentioned angle α1 and the after-mentioned angle α2 are defined by the widthwise center line 7*c* (shown in FIG. 4) of the middle lateral groove 7.

The second portion 12 in this example extends in an arc shape in the plan view of the tread portion.

Such second portion 12 can disperse the load when contacting with the ground, and serves to suppress the deformation of the middle lateral groove 7 and maintain the groove volume high.

The angle α2 (shown in FIG. 7) of the second portion 12 with respect to the tire axial direction is continuously decreased toward the outside in the tire axial direction. However, the second portion 12 may extend straight.

The second portion 12 extends from the middle circumferential groove 4. Thus, the middle lateral groove 7 extends across the entire width of the middle land region 5. Such middle lateral groove 7 has high drainage property and exerts a large shearing force with respect to compacted snow block, and improves wet performance and snow performance.

In the first mode, the middle block 5*a* is formed as a middle block 5R divided by the middle lateral grooves 7 adjacent to each other in the tire circumferential direction. However, according to the present disclosure, the middle lateral groove 7 is not limited to such configuration. For example, the middle lateral groove 7 may be formed as a semi-closed groove (not shown) having an axially inner end terminated within the middle land region 5.

The second portion 12 is inclined with respect to the tire axial direction at a larger angle than the first portion 11. Such second portion 12 can increase the groove volume of the middle lateral groove 7, and effectively discharge or remove the water film existing between the road surface and the ground contacting surface of the middle land region 5 (or the treads 9 of the middle blocks).

The angle β between the second portion 12 and the middle circumferential groove 4 is preferably not less than 50 degrees, more preferably not less than 55 degrees, but preferably not more than 80 degrees, more preferably not more than 75 degrees.

By setting the angle β to 50 degrees or more, a decrease in the rigidity of the middle land region 5 in the vicinity of the second portion 12 can be suppressed. Further, water and snow in the second portion 12 are smoothly discharged into the middle circumferential groove 4.

By setting the angle β to 80 degrees or less, the deformation of the middle land region 5 when contacting with the ground is suppressed, and the groove width of the second portion 12 is secured. Thereby, wet performance and snow performance can be enhanced.

In the present embodiment, the angle β is measured between the second longitudinal side wall 8*d* and the second lateral side wall 8*b* at a position 10 mm outward in the tire axial direction from an intersection K where the second longitudinal side wall 8*d* intersects with the second lateral side wall 8*b*.

Figure 6:
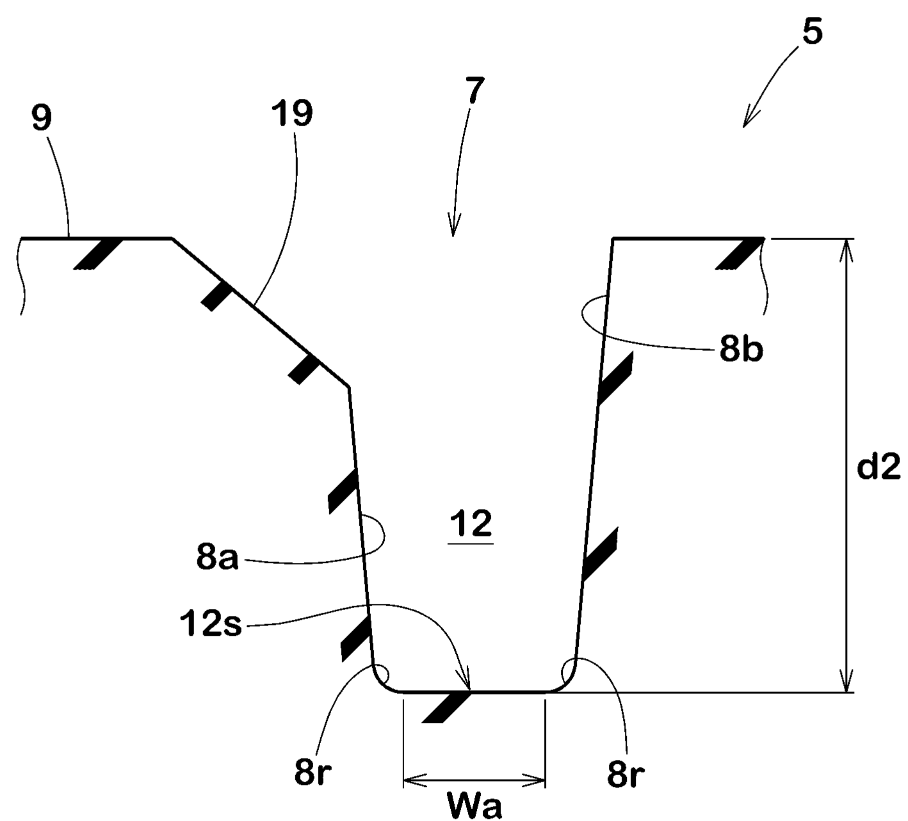
FIG. 6 is a cross-sectional view taken along line A-A of FIG. 4.

FIG. 6 is a cross-sectional view taken along line A-A of FIG. 4.

It is preferable that the groove width Wa of the second portion 12 measured at the groove bottom 12*s* (shown in FIG. 6) is constant over the entire length of the second portion 12. Such second portion 12 further maintains the rigidity of an axially inner portion of the middle land region 5, and suppresses deterioration of the steering stability performance.

Here, the groove width Wa at the groove bottom 12*s* is the distance between the radially inner ends of the first lateral side wall 8*a* and the second lateral side wall 8*b* forming the middle lateral groove 7.

In this example, as shown in FIG. 6, the radially inner ends are formed by those of rounded portions 8*r* which are each convex outward of the middle lateral groove 7 and which have the smallest radius of curvature.

It is preferable that, as shown in FIG. 5, the groove width W3 of the first portion 11 is larger than the groove width W4 of the second portion 12, each measured at the groove top. Thereby, an axially inner portion of the middle land region 5 on which a particularly large contact pressure acts, can be prevented from decreasing in rigidity to maintain steering stability performance.

Although not particularly limited, it is preferred that the groove width W3 of the first portion 11 is not less than 1.1 times, more preferably not less than 1.2 times, but not more than 1.5 times, more preferably not more than 1.4 times the groove width W4 of the second portion 12.

Further, it is preferable that the groove width W3 of the first portion 11 is not less than 5%, more preferably not less than 10%, but not more than 25%, more preferably not more than 20% of the maximum width Wm of the middle land region 5.

It is preferable that the groove depth of the first portion 11 is not less than 85%, more preferably not less than 95%, but not more than 115%, more preferably not more than 105% of the groove depth d2 (shown in FIG. 6) of the second portion 12. It is most desirable that the groove depth of the first portion 11 is equal to the groove depth d2 of the second portion 12.

As shown in FIG. 6, the connect portion 13 is positioned on the tire equator C side of the above-mentioned middle position 5*c* in the tire axial direction of the middle land region 5. Thereby, the first portion 11 having the small angle α1 can secure a larger length and exert a large shearing force with respect to compacted snow block. Further, since the connect portion 13 in which snow is easily clogged, is positioned near the middle circumferential groove 4, the snow is smoothly discharged to the middle circumferential groove 4.

In order to effectively derive the above-mentioned functions, it is preferred that the distance La in the tire axial direction between the connect portion 13 and the middle circumferential groove 4 is not less than 3 mm, more preferably not less than 4 mm, not more than 7 mm, more preferably not more than 6 mm.

Here, the distance La is that between the axially inner end 12*i* of the second portion 12 and the after-mentioned connect point 29.

The axially inner end 12*i* of the second portion 12 is determined on the widthwise center line 12*c* of the second portion 12 (or the widthwise center line 7*c* of the middle lateral groove 7).

The third side wall 19 in this example is terminated within the longitudinal extent of the middle lateral groove 7 without extending to the middle circumferential groove 4 as shown in FIG. 2. Such third side wall 19 secures the edge effect by the second portion 12 at a high level and improves the snow performance.

As shown in FIG. 3, the third side wall 19 has a radially outer edge 21 which is a boundary with the block tread 9, a first edge 22 which is a boundary with the first side wall 17, and a second edge 23 which is a boundary with the second side wall 18.

Each of the first edge 22 and the second edge 23 is inclined inward in the tire radial direction toward the connect point 29 between the first edge 22 and the second edge 23.

The connect point 29 is included in the connect portion 13. The connect point 29 defines a bent point between the first edge 22 and the second edge 23.

The connect point 29 delimits the boundary between the first portion 11 and the second portion 12.

The radially outer edge 21 is longer than the first edge 22 and the second edge 23. Such radially outer edge 21 further suppresses a decrease in the rigidity of the convex corner portion 15.

The length L1 of the radially outer edge 21 is larger than the shortest distance L2 (shown in FIG. 2) between the connect point 29 and the radially outer edge 21 in the plan view of the tread portion.

Such third side wall 19 further suppresses a decrease in the rigidity of the convex corner portion 15.

Although not particularly limited, it is preferred that the length L1 of the radially outer edge 21 is not less than 10%, more preferably not less than 15%, but not more than 30%, more preferably not more than 25% of the maximum width Wm (shown in FIG. 5) in the tire axial direction of the middle land region 5. It is preferable that the shortest distance L2 is not less than 3 mm, more preferably not less than 4 mm, but not more than 7 mm, more preferably not more than 6 mm.

It is desirable that the connect point 29 is located in a range from 30% to 50% of the maximum groove depth d (shown in FIG. 3) of the middle lateral groove 7 from the block tread 9.

Thereby, water and snow in the middle lateral groove 7 can be smoothly discharged, and the rigidity of the middle land region 5 can be suppressed from becoming lowered. Therefore, the wet performance and the snow performance are improved, and the deterioration of the steering stability performance can be suppressed.

In order to effectively derive such advantageous functions, it is more desirable that the connect point 29 is located in a range from 35% to 45% of the maximum groove depth d.

Figure 7:
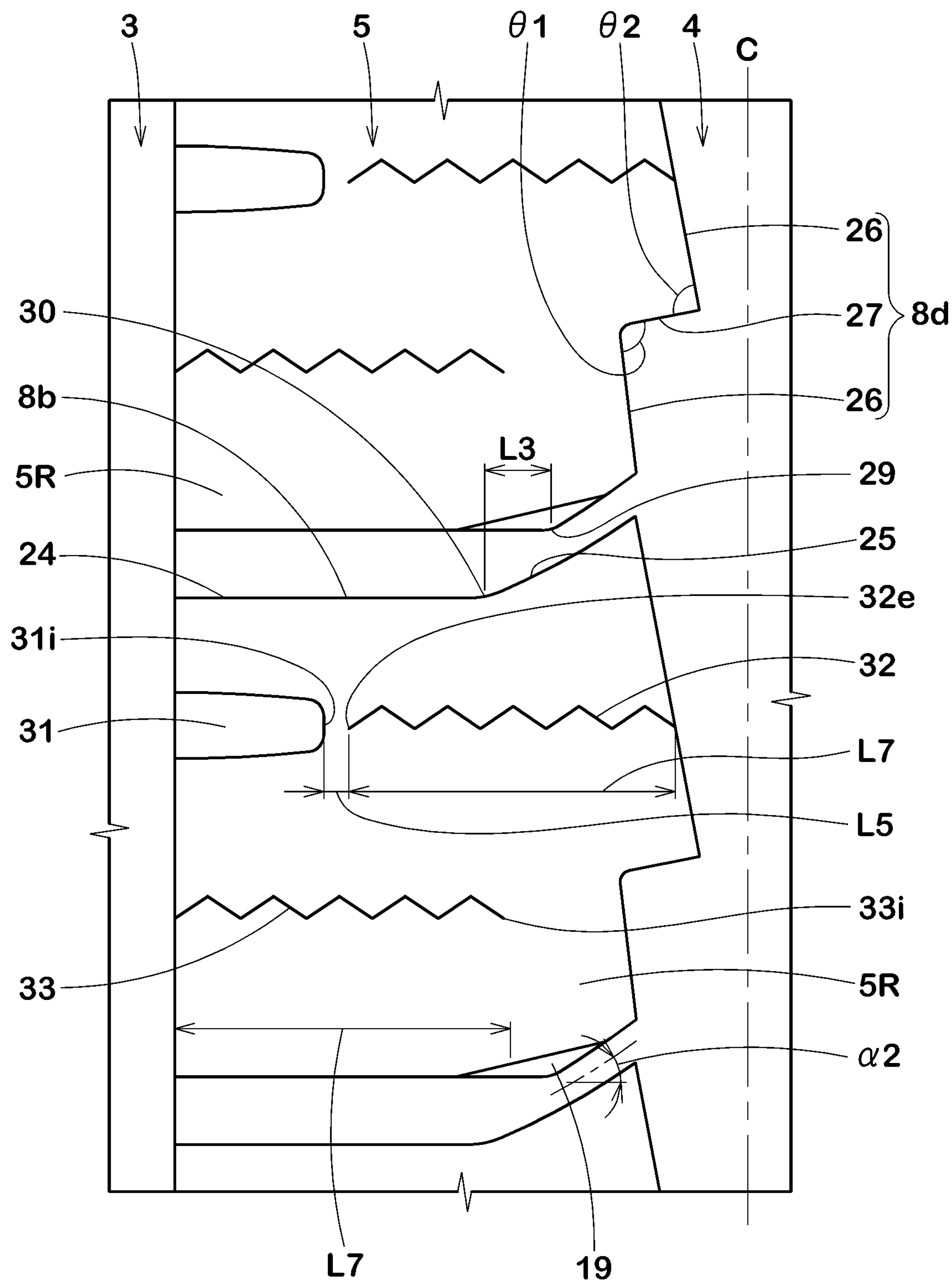
FIG. 7 is the plan view which is the same as FIG. 5 but differently provided with reference signs.

FIG. 7 is a plan view of a part of the middle land region 5 which is the same as FIG. 5 but differently provided with reference numbers.

As shown in FIG. 7, the second lateral side wall 8*b* includes a fourth side wall 24 extending from the shoulder circumferential groove 3, and a fifth side wall 25 extending from the middle circumferential groove 4 and having a larger angle with respect to the tire axial direction than the fourth side wall 24 in the plan view of the tread portion.

The connect point 30 between the fourth side wall 24 and the fifth side wall 25 (hereinafter, may be referred to as the second connect point 30)

is displaced in the tire axial direction from the connect point 29 between the first edge 22 and the second edge 23 (hereinafter, may be referred as the first connect point 29).

Thereby, when the tire 1 is rolling, the deformation of the middle lateral groove 7 is caused at different positions of the first connect point 29 and the second connect point 30, so the snow is ejected more smoothly.

The distance L3 in the tire axial direction between the first connect point 29 and the second connect point 30 is preferably set to be smaller than the length L1 of the radially outer edge 21. Thereby, it is possible to suppress the deterioration of steering stability performance and improve the snow performance. In order to effectively derive such advantageous effects, it is preferred that the distance L3 is not less than 35%, more preferably not less than 40%, but not more than 55%, more preferably not more than 50% of the length L1 of the radially outer edge 21.

As shown in FIG. 7, the second longitudinal side wall 8*d* in this example includes two longitudinal wall portions 26 extending from both ends in the tire circumferential direction of the middle block 5R, and a lateral wall portion 27 connecting the two longitudinal wall portions 26.

The inclination angle of the lateral wall portion 27 with respect to the tire axial direction is smaller than that of each longitudinal wall portion 26.

In the plan view of the tread portion, the angles θ1 and θ2 of the respective longitudinal wall portions 26 with respect to the lateral wall portion 27 (whichever is smaller than 180 degrees) are preferably not less than 80 degrees, more preferably not less than 85 degrees, but preferably not more than 100 degrees, more preferably not more than 95 degrees. Since the angles θ1 and θ2 are not less than 80 degrees and not more than 100 degrees, the decrease in the rigidity of a portion of the middle block 5R formed by the longitudinal wall portions 26 and the lateral wall portion 27 can be suppressed, and the compacted snow block shearing force is secured. Thereby, the steering stability and snow performance can be improved.

In the present embodiment, the middle land regions 5 are further provided with middle auxiliary grooves 31, first middle sipes 32 and second middle sipes 33.

Here, the term "sipe" means a very narrow groove having a groove width less than 1.5 mm inclusive of a cut having no substantial width. The term "groove" as used for the circumferential groove, lateral groove and auxiliary groove in this specification means a relatively wide groove having a groove width of 1.5 mm or more.

The middle auxiliary grooves 31 in the present embodiment extend axially inwardly from the shoulder circumferential groove 3, and terminate within the middle blocks 5R. The middle auxiliary grooves 31 in this example extend in parallel with the tire axial direction.

Such middle auxiliary grooves 31 increase the shearing force with respect to compacted snow blocks.

In the present embodiment, the expression "parallel with the tire axial direction" means that the angle with respect to the tire axial direction is not more than 20 degrees including 0 degrees.

The first middle sipe 32 in the present embodiment extends from the middle circumferential groove 4 toward the outside in the tire axial direction.

The first middle sipe 32 in this example overlaps with the middle auxiliary groove 31 in the tire circumferential direction.

Such first middle sipe 32 reduces the rigidity of the middle block 5R in the vicinity of the middle auxiliary groove 31 and increases the vibration due to the rolling of the tire 1. Thereby, the deformation of the middle auxiliary groove 31 is promoted, and the snow is ejected smoothly.

Although not particularly limited, it is preferable that the distance L5 in the tire axial direction between the axially outer end 32*e* of the first middle sipe 32 and the axially inner end 31*i* of the middle auxiliary groove 31 is not less than 2%, more preferably not less than 3% of the maximum width Wm (shown in FIG. 5) of the middle land region 5. Further, it is preferable that the distance L5 is not more than 6%, more preferably not more than 5% of the maximum width Wm.

The second middle sipe 33 in the present embodiment extends from the shoulder circumferential groove 3 toward the inside in the tire axial direction and terminates within the middle block 5R.

The axially inner end 33*i* of the second middle sipe 33 overlaps, in the tire axial direction, with the axial extent of the third side wall 19.

Such second middle sipe 33 has a large water absorption effect and improves drainage performance.

The axial length L7 of the first middle sipe 32 and the axial length L7 of the second middle sipe 33 are preferably not less than 55%, more preferably not less than 60%, but preferably not more than 75%, more preferably not more than 70% of the maximum width Wm of the middle land region 5.

Figure 8:
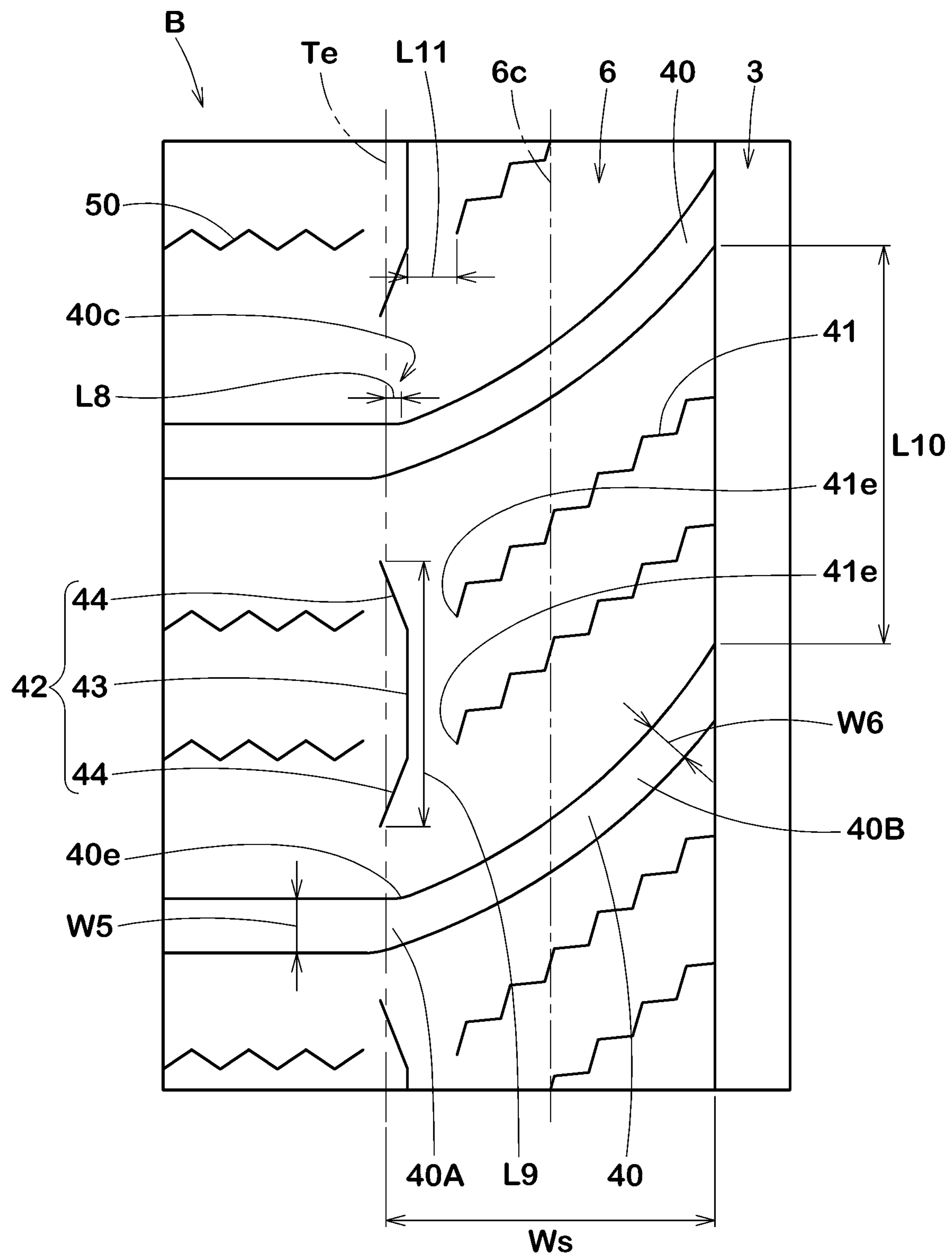
FIG. 8 is a plan view of a part of the shoulder land region of the tire according to the first mode.

FIG. 8 is a plan view of a part of one of the shoulder land regions 6 shown in FIG. 4. As shown, each of the shoulder land regions 6 is provided with shoulder lateral grooves 40 extending across the entire axial width of the shoulder land region 6, shoulder inclined sipes 41 inclining with respect to the tire axial direction, and shoulder longitudinal sipes 42 extending in the tire circumferential direction.

The shoulder lateral grooves 40 in the present embodiment extend from the shoulder circumferential groove 3 toward the outside in the tire axial direction beyond the adjacent tread edge Te.

The shoulder lateral groove 40 in this example comprises an axial portion 40A extending in parallel with the tire axial direction, and an inclined portion 40B connected to the axial portion 40A and extending at a larger inclination angle than the axial portion 40A.

The axial portion 40A is positioned axially outside the inclined portion 40B. The both edges of the axial portion 40A extend straight in the plan view of the tread portion. The both edges of the inclined portion 40B extend in an arc shape in the plan view of the tread portion.

The inclined portion 40B is formed within the shoulder land region 6.

The connect position 40*c* between the axial portion 40A and the inclined portion 40B is located on the tread edge Te side of the middle position 6*c* in the tire axial direction of the shoulder land region 6.

The distance L8 in the tire axial direction between the connect position 40*c* and the adjacent tread edge Te is preferably not less than 3 mm, more preferably not less than 4 mm, but preferably not more than 7 mm, more preferably not more than 6 mm.

Here, the connect position 40*c* is at the innermost end 40*e* in the tire axial direction of the convex edge of the axial portion 40A as shown in FIG. 8.

It is preferable that the groove width W5 in the axial portion 40A is larger than the groove width W6 in the inclined portion 40B as shown in FIG. 8. Thereby, the water in the shoulder lateral groove 40 is smoothly discharged toward the outside from the tread edge Te.

The groove width W5 of the axial portion 40A is preferably not less than 3 mm, more preferably not less than 4 mm, but preferably not more than 7 mm, more preferably not more than 6 mm.

The groove width W6 of the inclined portion 40B is preferably not less than 2 mm, and preferably not more than 3 mm.

In the present embodiment, the groove width W5 of the axial portion 40A is that in the buttress region B described later.

Between every two of the circumferentially adjacent shoulder lateral grooves 40, two of the shoulder inclined sipes 41 are disposed.

The shoulder inclined sipes 41 extend from the shoulder circumferential groove 3 toward the outside in the tire axial direction and terminate within the shoulder land region 6.

The axially outer end 41*e* of each of the shoulder inclined sipes 41 overlaps, in the tire circumferential direction, with the circumferential extent of one of the shoulder longitudinal sipes 42.

The shoulder longitudinal sipe 42 in the present embodiment is composed of a main portion 43 extending in substantially parallel with the tire circumferential direction within the shoulder land region 6, and a pair of sub portions 44 respectively extending from both ends of the main portion 43, in oblique directions, away from the main portion 43 in the tire circumferential direction, beyond the tread edge Te.

Here, the expression "substantially parallel with the tire circumferential direction" means that the angle with respect to the tire circumferential direction is in a range from 0 to 20 degrees.

Such shoulder longitudinal sipes 42 reduce the rigidity of the shoulder land region 6 near the tread edge Te, thereby reducing the self-aligning torque power (SATP). As a result, the equivalent cornering power (equivalent CP) of the tire as a whole is increased, and deterioration of steering stability performance is suppressed.

The equivalent CP is a value obtained by dividing the cornering power by SATP. The SATP is a self-aligning torque (SAT) when the running tire 1 is given a slip angle of 1 degree.

The SAT is given by the sum of the braking force and driving force in the tire circumferential direction in the tread contact patch.

It is preferable that the length L9 in the tire circumferential direction of the shoulder longitudinal sipe 42 is not less than 50% of the distance L10 in the tire circumferential direction between the shoulder lateral grooves 40 adjacent to each other in the tire circumferential direction as shown in FIG. 8.

As a result, the above-mentioned function is effectively exerted.

More specifically, the length L9 of the shoulder longitudinal sipe 42 is preferably not less than 55%, more preferably not less than 60%, but preferably not more than 75%, more preferably not more than 70% of the distance L10 between the shoulder lateral grooves 40.

As a result, the decrease in the rigidity in the tire axial direction of the shoulder land region 6 is suppressed, and the steering stability performance is more sufficiently maintained.

From the same viewpoint, the shortest distance L11 between the shoulder longitudinal sipe 42 and the shoulder inclined sipe 41 is preferably not less than 10%, more preferably not less than 15%, but preferably not more than 30%, more preferably not more than 25% of the width Ws in the tire axial direction of the shoulder land region 6.

In the tire 1 according to the first mode, a buttress region B extending axially outwardly from each tread edge Te is provided with a plurality of outer sipes 50.

When the tire under the above-mentioned normally loaded condition is contacted with a flat horizontal surface at a camber angle of zero, the buttress region B does not contact with the flat horizontal surface. But, during running on the actual roads under load, especially during cornering, and running on snowy or muddy or relatively soft ground, the buttress region B is likely to contact with the ground.

The outer sipes 50 terminate within the buttress region B without reaching the tread edge Te.

Between every two of the axial portions 40A adjacent to each other in the tire circumferential direction, two of the outer sipes 50 are disposed.

The outer sipes 50 each extend along a straight line parallel to the tire axial direction.

Each of the outer sipes 50 overlaps with the circumferential extent of one of the shoulder longitudinal sipes 42 in the tire circumferential direction.

<Second Mode>

Hereinafter, a second mode for carrying out the present disclosure will be descried in detail.

Figure 9:
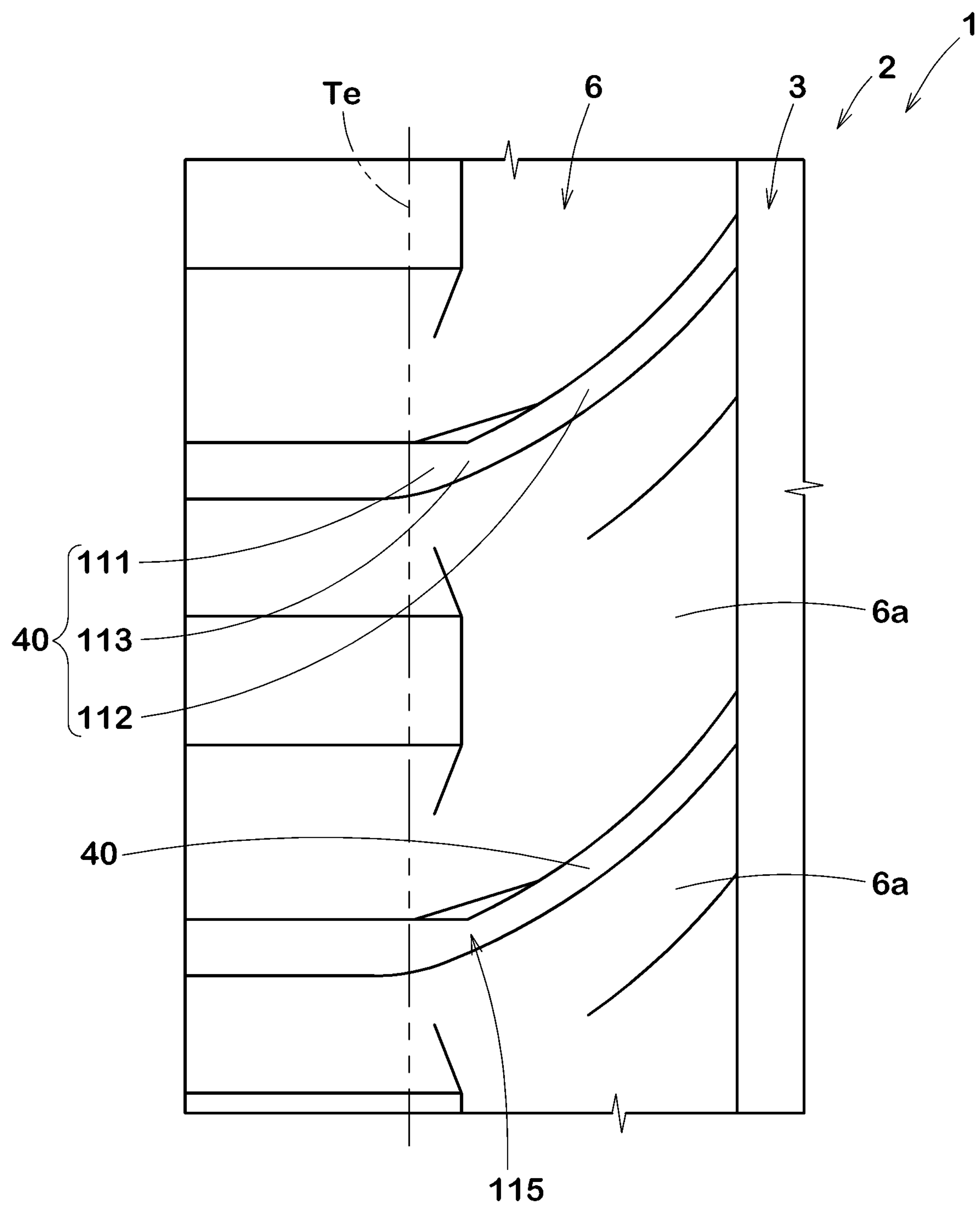
FIG. 9 is a plan view of a part of a shoulder land region of a tire according to a second mode for carrying out the present disclosure.

According to the second mode, a tire 1 comprises a tread portion 2 comprising a shoulder land region 6, as shown in FIG. 9, divided by a shoulder circumferential groove 3 and a tread edge Te.

During cornering, the shoulder land region 6 is subjected to a relatively large lateral force, and has a larger effect on steering stability, uneven wear resistance, and wet performance.

The second mode is therefore intended to improve these performances focusing on the shoulder land region 6.

As shown in FIG. 9, the shoulder land region 6 is provided with a plurality of shoulder lateral grooves 40, and thereby, divided into a plurality of shoulder blocks 6*a*.

Each of the shoulder lateral grooves 40 comprises a first portion 111 extending axially inwardly from the adjacent tread edge Te, a second portion 112 positioned on the shoulder circumferential groove 3 side of the first portion 111 and inclined with respect to the first portion 111, and a connect portion 113 in which the first portion 111 and the second portion 112 are connected with each other.

Such shoulder lateral groove 40 provides edge components in multiple directions, and improves wet performance.

In the second mode, the shoulder blocks 6*a* each have a convex corner portion 115 which is convex to the outside of the block at the connect portion 113.

Figure 10:
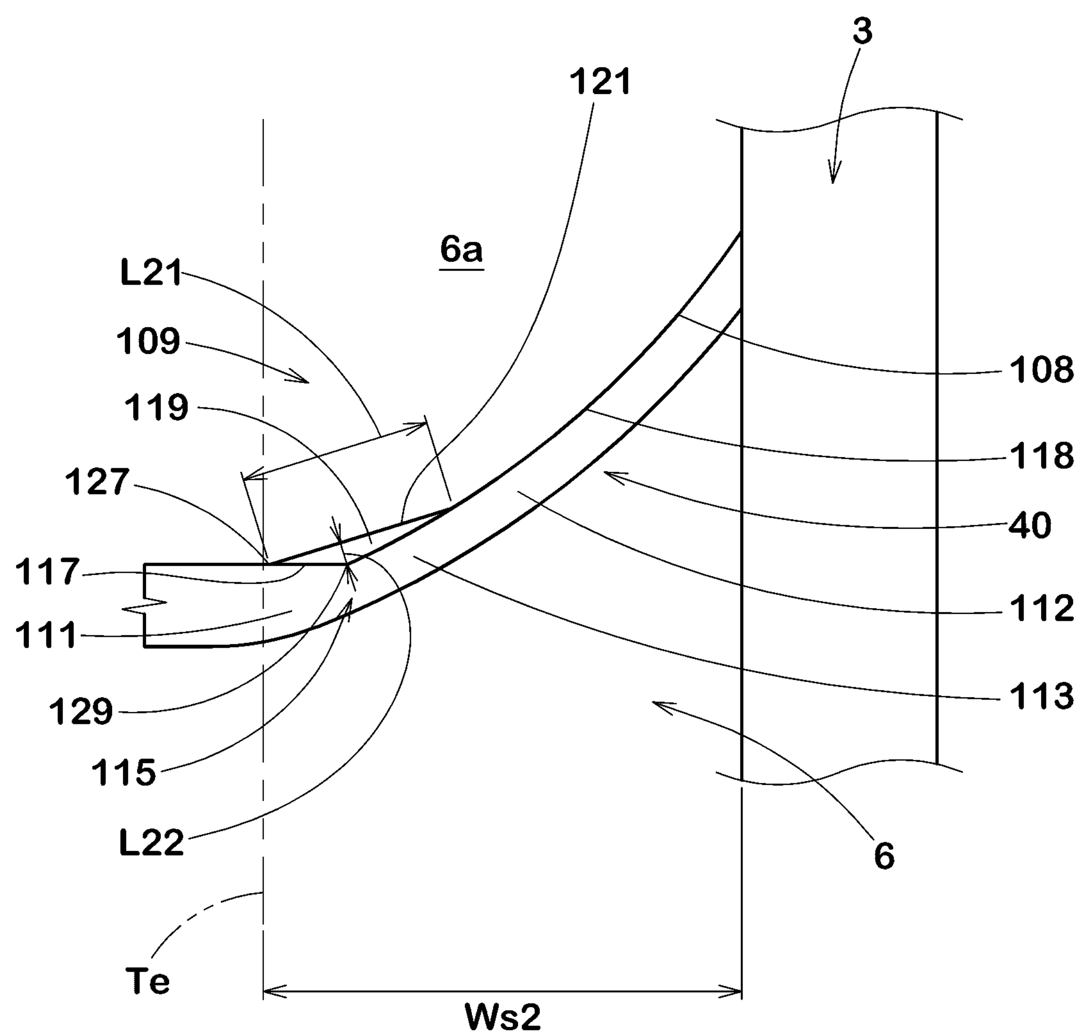
FIG. 10 is an enlarged view showing a shoulder lateral groove shown in FIG. 9.
Figure 11:
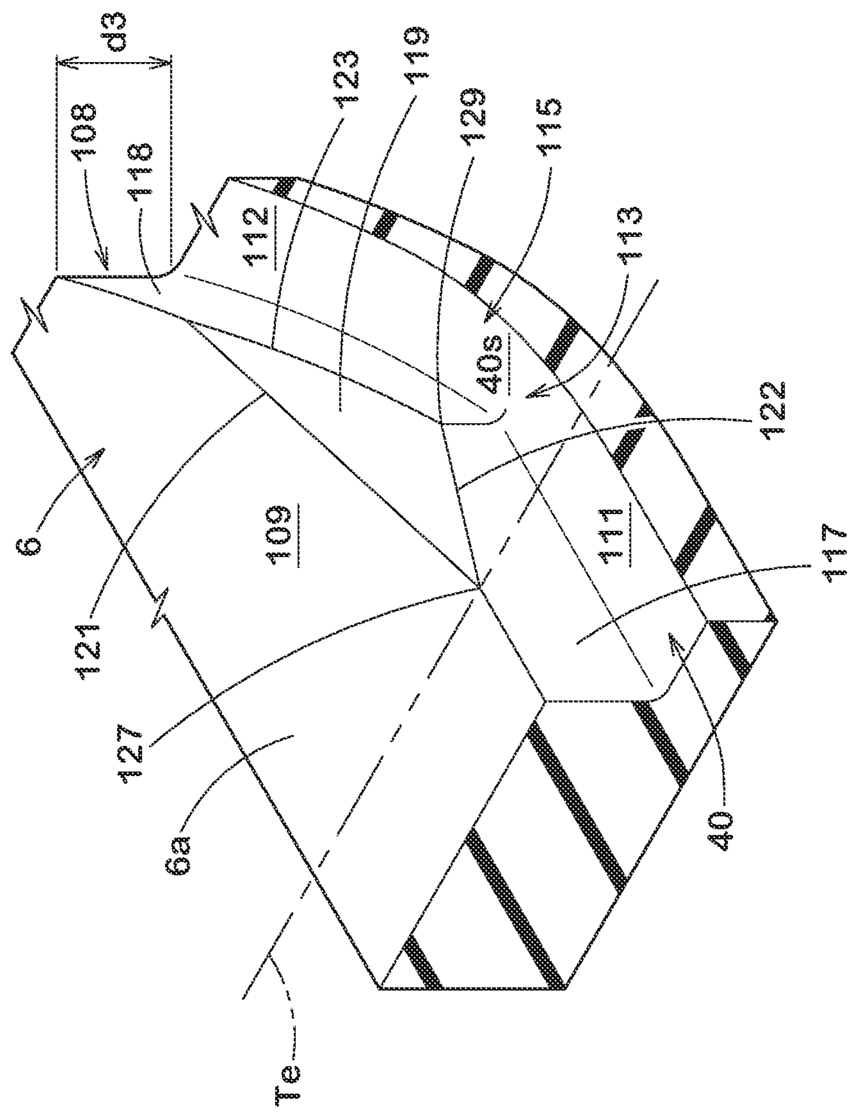
FIG. 11 is a perspective view showing a convex corner portion shown in FIG. 9.

FIG. 10 is an enlarged top view of the shoulder lateral groove 40 shown in FIG. 9. FIG. 11 is a perspective view of the convex corner portion 115 shown in FIG. 9.

As shown in FIGS. 10 and 11, the block side wall 108 in the convex corner portion 115 (hereinafter, the first lateral side wall 108*a*) includes a first side wall 117, a second side wall 118, and a third side wall 119.

The first side wall 117 extends along the first portion 111. The second side wall 118 extends along the second portion 112.

The third side wall 119 has a substantially triangular shape and intersects the first side wall 117, the second side wall 118, and the shoulder block's tread 109.

Such third side wall 119 increases the groove volume in the connect portion 113 which usually has a large drainage resistance, and facilitates drainage in the connect portion 113. Therefore, wet performance is improved.

The radially innermost end of the third side wall 119 is located radially outside the groove bottom 40*s* of the shoulder lateral groove 40. In other words, the third side wall 119 does not reach the groove bottom 40*s*. As a result, a decrease in the rigidity of the shoulder block 6*a* is suppressed, and deterioration of the steering stability performance and deterioration of the uneven wear resistance performance are suppressed.

Figure 12:
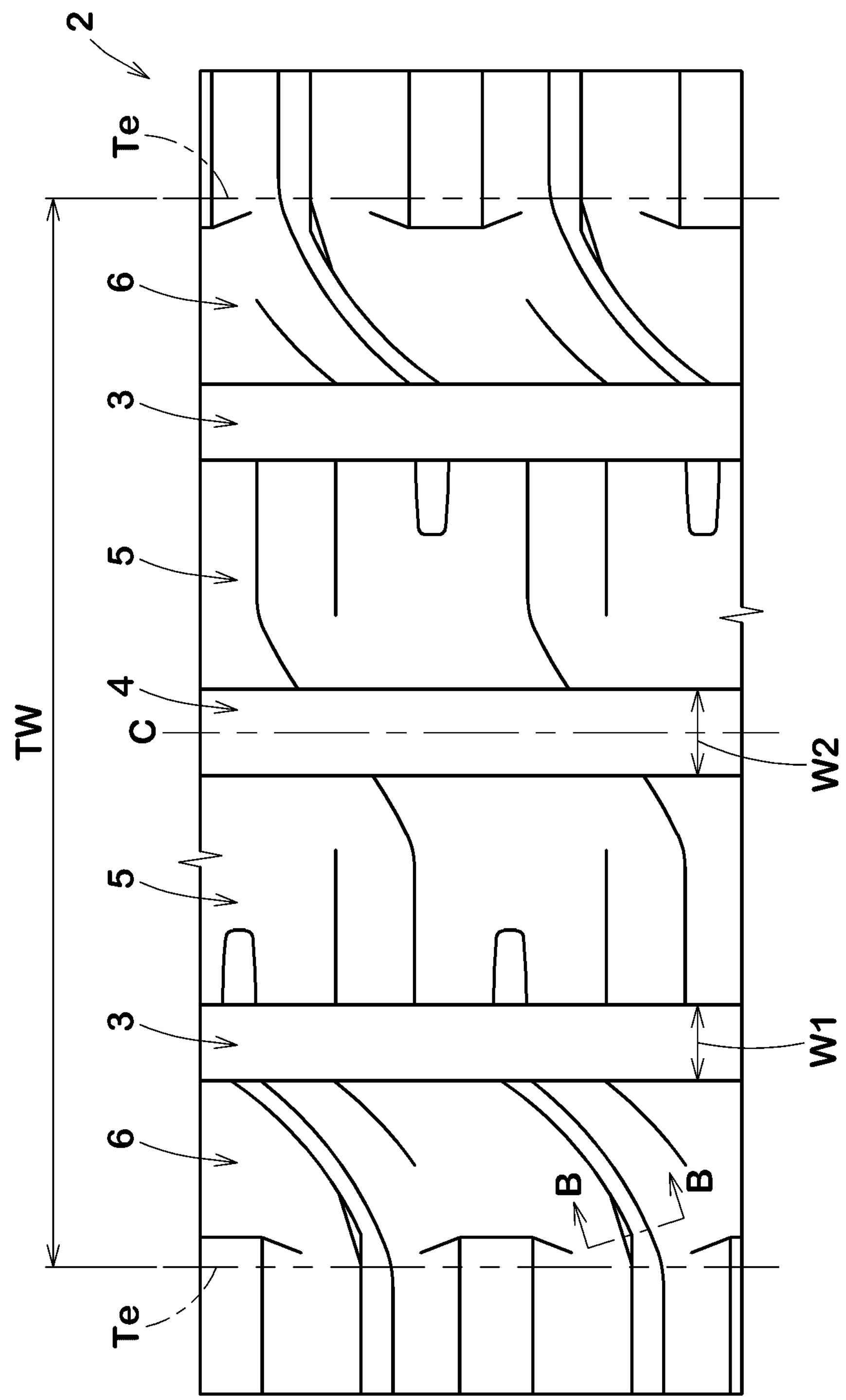
FIG. 12 is a plan view of a part of the tread portion of the tire according to the second mode.

FIG. 12 is a plan view of a part of the tread portion 2. As shown in FIG. 12, the tread portion 2 in the present embodiment is provided with two shoulder circumferential grooves 3 and one middle circumferential groove 4 therebetween.

Thereby, the tread portion 2 is axially divided into a pair of the shoulder land regions 6, and a pair of middle land regions 5 defined between the middle circumferential groove 4 and the respective shoulder circumferential grooves 3. According to the present disclosure, however, the tread portion 2 is not limited to such example. For example, the tread portion 2 may be provided with two shoulder circumferential grooves and two middle circumferential grooves so that the tread portion 2 is divided into a pair of shoulder land regions, a pair of middle land regions, and a crown land region defined between the two middle circumferential grooves.

In the present embodiment, the shoulder circumferential grooves 3 extend continuously in the tire circumferential direction.

The shoulder circumferential grooves 3 in this example extend straight in parallel with the tire circumferential direction. Such shoulder circumferential grooves 3 improves drainage performance.

The middle circumferential groove 4 in the present embodiment extends continuously in the tire circumferential direction.

The middle circumferential groove 4 in this example extends straight in parallel with the tire circumferential direction. Thereby, the drainage performance is further improved.

The middle circumferential groove 4 in this example is disposed on the tire equator C.

The middle circumferential groove 4 and the shoulder circumferential grooves 3 are not limited to such configurations. For example, each groove 3, 4 may be a zigzag groove or a wavy groove.

It is preferable that, as shown in FIG. 12, the groove width W2 of the middle circumferential groove 4 is larger than the groove width W1 of the shoulder circumferential grooves 3. Thereby, effective drainage can be ensured in the vicinity of the tire equator C in which drainage is usually relatively difficult.

Although not particularly limited, the groove width W2 of the middle circumferential groove 4 is preferably not less than 1.05 times, more preferably not less than 1.10 times, but preferably not more than 1.30 times, more preferably not more than 1.25 times the groove width W1 of the shoulder circumferential grooves 3.

The groove width W1 of the shoulder circumferential groove 3 is preferably not less than 5.0%, more preferably not less than 6.0%, but preferably not more than 11.0%, more preferably not more than 10.0% of the tread width TW.

Figure 13:
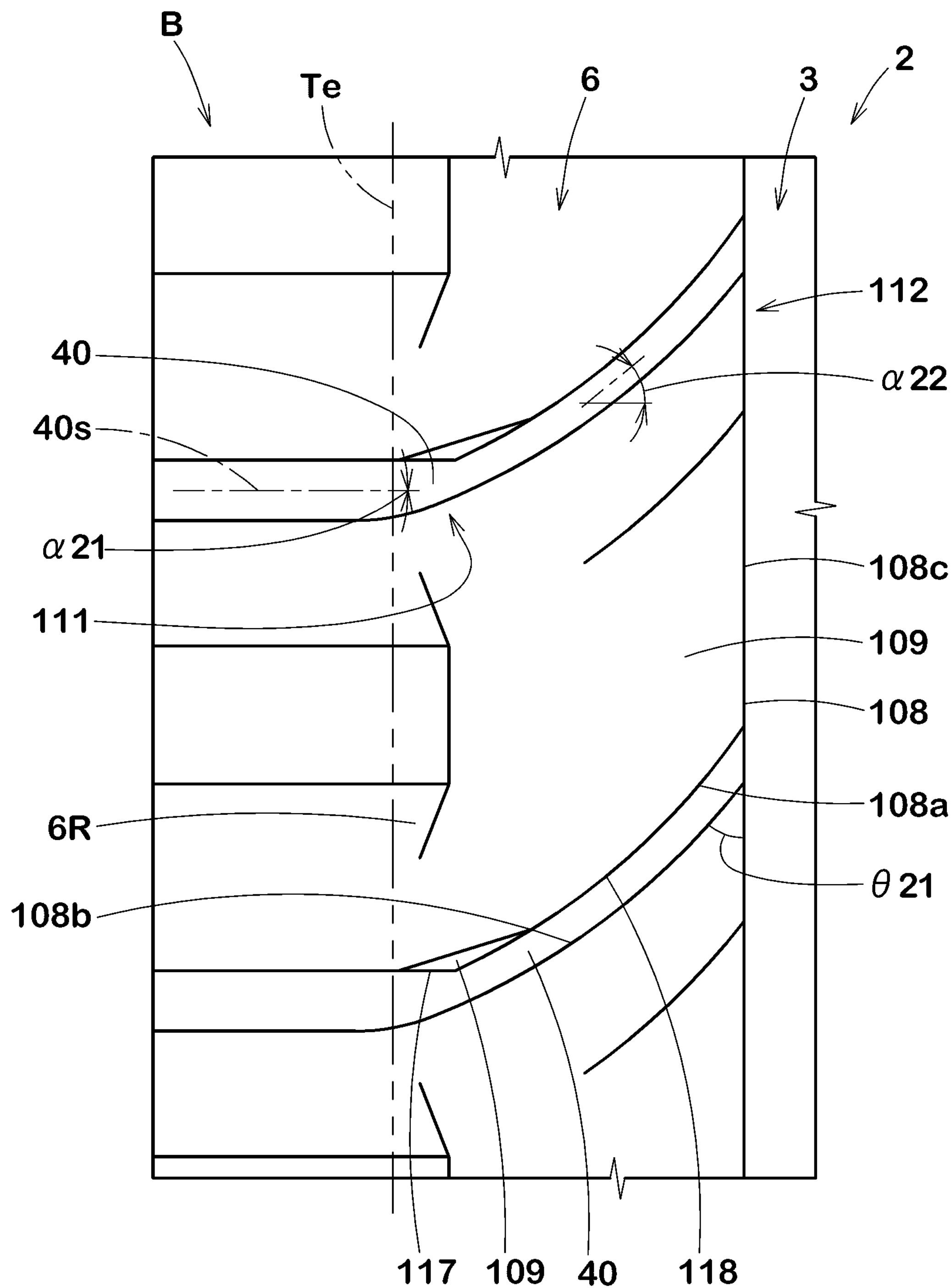
FIG. 13 is the plan view which is the same as FIG. 9 but differently provided with reference signs.

FIG. 13 is a plan view of a part of one of the shoulder land regions 6. The shoulder block 6*a* has a tread 109 or ground contacting surface, and a side wall 108 extending radially inwardly from the peripheral edge of the tread 109. The side wall 108 is formed by the groove walls of the surrounding grooves 3 and 40 as shown in FIG. 13.

According to the second mode, the shoulder block's side wall 108 includes the above-mentioned first lateral side wall 108*a* forming the convex corner portion 115, a second lateral side wall 108*b* facing the first lateral side wall 108*a* of the next shoulder block, and a first longitudinal side wall 108*c* forming a part of one of the groove side walls of one of the shoulder circumferential grooves 3.

Between the first lateral side wall 108*a* and the second lateral side wall 108*b*, the shoulder lateral groove 40 is formed.

The first lateral side wall 108*a* includes the above-mentioned first side wall 117, second side wall 118 and third side wall 119.

The tire 1 according to the second mode is provided with a buttress region B extending axially outwardly from each tread edge Te.

When the tire under the above-mentioned normally loaded condition is contacted with a flat horizontal surface at a camber angle of zero, the buttress region B does not contact with the flat horizontal surface. But, during running on the actual roads under load, especially during cornering, and running on snowy or muddy or relatively soft ground, the buttress region B is likely to contact with the ground.

In the present embodiment, the first portion 111 of the shoulder lateral groove 40 extends straight. Such first portion 111 maintains high rigidity of the shoulder land region 6. The first portion 111 extends from the shoulder land region 6 to the axially outside of the tread edge Te, namely, to the buttress region B.

It is preferable that the angle α21 of the first portion 111 with respect to the tire axial direction is not more than 20 degrees. This makes it possible to exert great traction on wet road surfaces.

In this example, the angle α21 of the first portion 111 in the buttress region B is 0 degrees.

The above-mentioned angle α21 and the after-mentioned angle α22 are defined by the widthwise center line 40*s* of the shoulder lateral groove 40.

The second portion 112 in this example extends in an arc shape in the plan view of the tread portion.

The angle α22 of the second portion 112 with respect to the tire axial direction is continuously decreased toward the axially outside.

Such second portion 112 can disperse the load when contacting with the ground, and suppress deformation of the shoulder lateral groove 40. This helps to maintain a large groove volume.

The second portion 112 extends from the shoulder circumferential groove 3. Thus, the shoulder lateral groove 40 crosses the entire axial width of the shoulder land region 6. Such shoulder lateral groove 40 has high drainage property and improves wet performance.

In the second mode, the shoulder block 6*a* is formed as a shoulder block 6R divided by the shoulder lateral grooves 40 adjacent to each other in the tire circumferential direction.

The shoulder lateral groove 40 is not limited to such configuration. For example, the shoulder lateral groove may be configured to have an axially inner end (not shown) terminated within the shoulder land region 6.

The second portion 112 is inclined with respect to the tire axial direction at a larger angle than that of the first portion 111.

Such second portion 112 increases the length (groove volume) of the shoulder lateral groove 40 to effectively remove the water film existing between the road surface and the tread 109 of the shoulder block or the tread of the shoulder land region 6.

The angle θ21 between the second portion 112 and the shoulder circumferential groove 3 is preferably not less than 30 degrees, more preferably not less than 35 degrees, but preferably not more than 50 degrees, more preferably not more than 45 degrees.

Here, the angle θ21 is an angle between the first longitudinal side wall 108*c* and the second lateral side wall 108*b* measured at a position 10 mm outward in the tire axial direction from the first longitudinal side wall 108*c*.

Since the angle θ21 is 30 degrees or more, the decrease in the rigidity of the shoulder land region 6 near the second portion 112 is suppressed. Further, the water in the second portion 112 is smoothly discharged into the shoulder circumferential groove 3.

Since the angle θ21 is 50 degrees or less, the deformation of the shoulder land region 6 at the time of contacting with the ground is suppressed, and the groove width of the second portion 112 is secured. This enhances wet performance.

Figure 14:
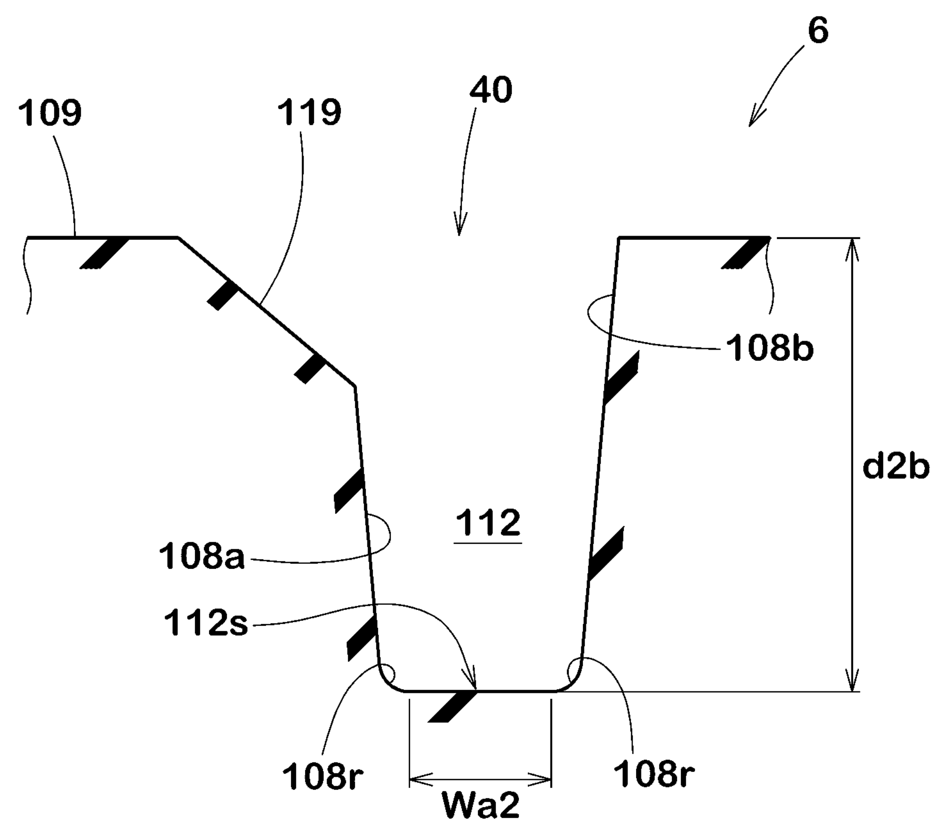
FIG. 14 is a cross-sectional view taken along line B-B of FIG. 12.

FIG. 14 is a cross-sectional view of the second portion 112 taken along the line B-B of FIG. 12.

The groove width Wa2 at the groove bottom 112*s* of the second portion 112 is preferably constant over the entire length of the second portion 112 as shown in FIGS. 13 and 14. Such second portion 112 further suppresses a decrease in the rigidity of the axially inner portion of the shoulder land region 6, and suppresses deterioration of the steering stability performance.

Here, the groove width Wa2 at the groove bottom 112*s* is the distance between the radially inner end of the first lateral side wall 108*a* and the radially inner end of the second lateral side wall 108*b*.

As shown in FIG. 14, the radially inner ends are formed by those of rounded portions 108*r* which are each convex outward of the shoulder lateral groove 40 and which have the smallest radius of curvature.

Figure 15:
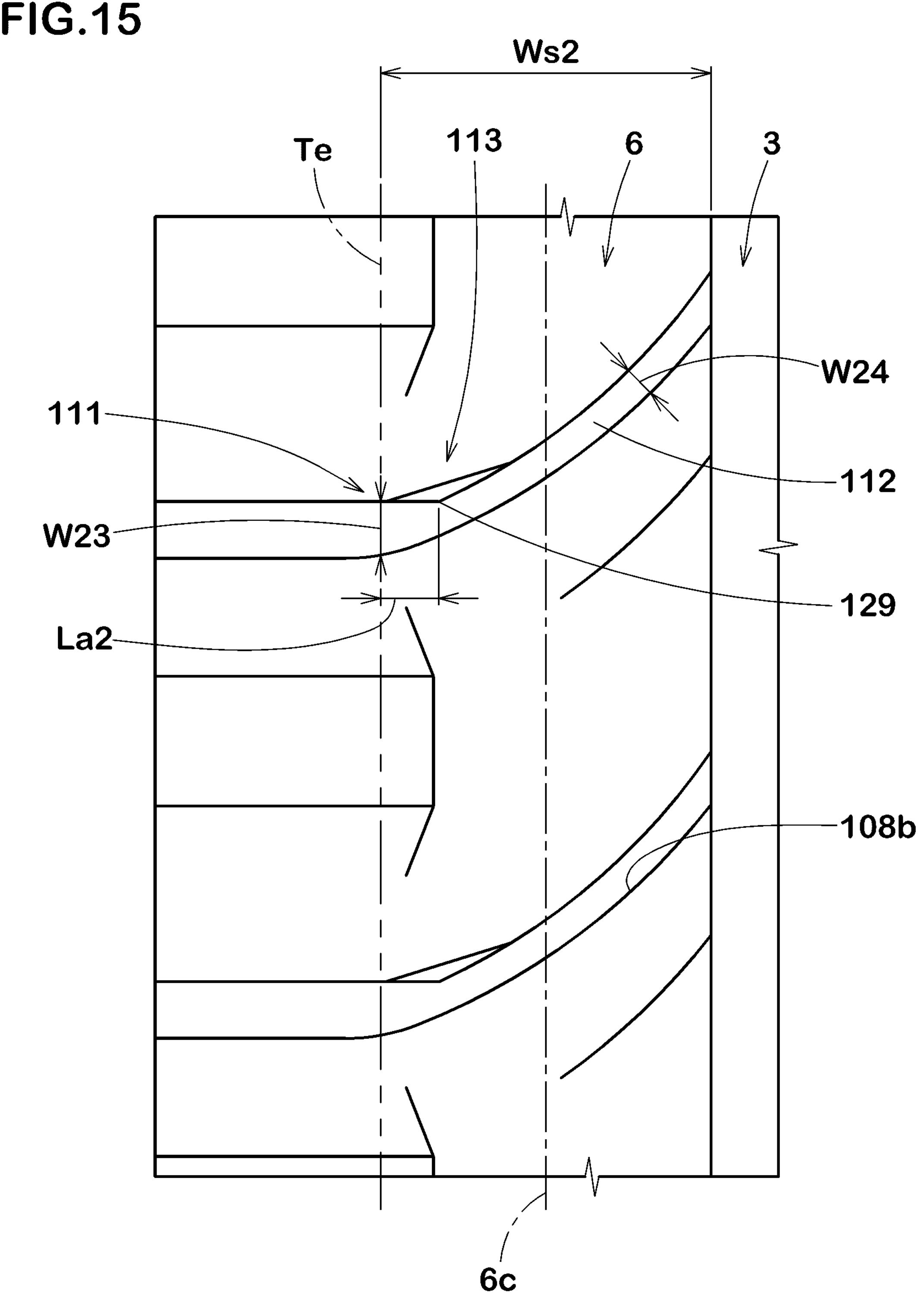
FIG. 15 is the plan view which is the same as FIGS. 9 and 13 but differently provided with reference signs.

FIG. 15 is a plan view showing a part of the shoulder land region 6. As shown, the groove width W23 of the first portion 111 is preferably larger than the groove width W24 of the second portion 112. Thereby, the water in the second portion 112 and the shoulder circumferential groove 3 can be easily discharged toward the outside from the tread edge Te, and the wet performance is enhanced. Although not particularly limited, the groove width W23 of the first portion 111 is preferably not less than 3 mm, more preferably not less than 4 mm, but preferably not more than 7 mm, more preferably not more than 6 mm.

The groove width W24 of the second portion 112 is preferably 2.0 to 3.0 mm.

The groove width W23 of the first portion 111 is the groove width measured in the shoulder land region 6.

It is preferable that the groove depth (not shown) of the first portion 111 is equal to the groove depth d2*b* (shown in FIG. 14) of the second portion 112. The groove depth of the first portion 111 is preferably not less than 90%, more preferably not less than 95%, but preferably not more than 110%, more preferably not more than 105% of the groove depth d2*b* of the second portion 112. The groove depth of the first portion 111 is the groove depth measured in the shoulder land region.

As shown in FIG. 15, the connect portion 113 is positioned axially outside the middle position 6*c* in the tire axial direction of the shoulder land region 6. Thereby, the second portion 112 having a relatively large angle α22 secures a larger length, and the drainage utilizing the rolling of the tire is effectively exhibited.

In order to effectively derive this advantageous function, the axial distance La2 between the connect portion 113 and the adjacent tread edge Te is preferably not less than 3 mm, more preferably not less than 4 mm, but preferably not more than 7 mm, more preferably not more than 6 mm.

Here, the axial distance La2 is that between the after-mentioned connect point 129 and the adjacent tread edge Te.

As shown in FIG. 11, the third side wall 119 according to the second mode has a radially outer edge 121 which is a boundary with the tread 109 of the block, a first edge 122 which is a boundary with the first side wall 117, and a second edge 123 which is a boundary with the second side wall 118. Each of the first edge 122 and the second edge 123 extends to the connect point 129 between the first edge 122 and the second edge 123, while inclining inward in the tire radial direction.

The connect point 129 is included in the connect portion 113.

The connect point 129 defines a bent point between the first edge 122 and the second edge 123. The connect point 129 delimits the boundary between the first portion 111 and the second portion 112.

The radially outer edge 121 is longer than the first edge 122 and the second edge 123. Such radially outer edge 121 further suppresses a decrease in the rigidity of the convex corner portion 115.

The length L21 of the radially outer edge 121 is larger than the shortest distance L22 between the connect point 129 and the radially outer edge 121 in the plan view of the tread portion, as shown in FIG. 10. Thereby, the third side wall 119 further suppresses a decrease in the rigidity of the convex corner portion 115.

Although not particularly limited, the length L21 of the radially outer edge 121 is preferably not less than 25%, more preferably not less than 30%, but preferably not more than 45%, more preferably not more than 40% of the axial width Ws2 of the shoulder land region 6.

The shortest distance L22 is preferably not less than 3 mm, more preferably not less than 4 mm, but preferably not more than 7 mm, more preferably not more than 6 mm.

The third side wall 119 in the present embodiment extends to the tread edge Te in substance. In other words, the connect point 127 between the radially outer edge 121 and the first edge 122 is positioned substantially at the tread edge Te.

Such third side wall 119 maintains high rigidity of the shoulder block 6*a* in the vicinity of the tread edge Te where a larger lateral force acts, and improves the uneven wear resistance performance as well as the drainage performance.

The connect point 127 is not limited to such position. For example, the connect point 127 may be positioned at a distance of not more than 5% of the shoulder land region's axial width Ws2 from the tread edge Te toward the axially inside or outside from the tread edge Te.

It is preferable that, in the tire radial direction, the connect point 129 between the first edge 122 and the second edge 123, is located in a range from 30% to 50% of the maximum groove depth d3 (shown in FIG. 11) of the shoulder lateral groove 40 from the tread 109 of the block. Thereby, drainage in the shoulder lateral groove 40 becomes smooth, and the decrease in the rigidity of the shoulder land region 6 can be suppressed. Therefore, it is possible to suppress deterioration of steering stability performance and deterioration of uneven wear resistance performance, while improving wet performance.

In order to exert such functions more effectively, the connect point 129 is more preferably located in a range from 35% to 45% of the maximum groove depth d3 from the tread 109 of the shoulder block.

As shown in FIG. 15, in the plan view of the tread portion, the second lateral side wall 108*b* is, continuously from the shoulder circumferential groove 3 to the tread edge Te, curved concavely (viewed from the other perspective, curved convexly toward the inside of the block) in an arc shape.

The angle of the second lateral side wall 108*b* with respect to the tire axial direction is continuously decreased from the shoulder circumferential groove 3 to the tread edge Te.

Such second lateral side wall 108*b* suppresses a decrease in the rigidity of the shoulder land region 6 and smoothes the flow of water in the shoulder lateral groove 40.

Figure 16:
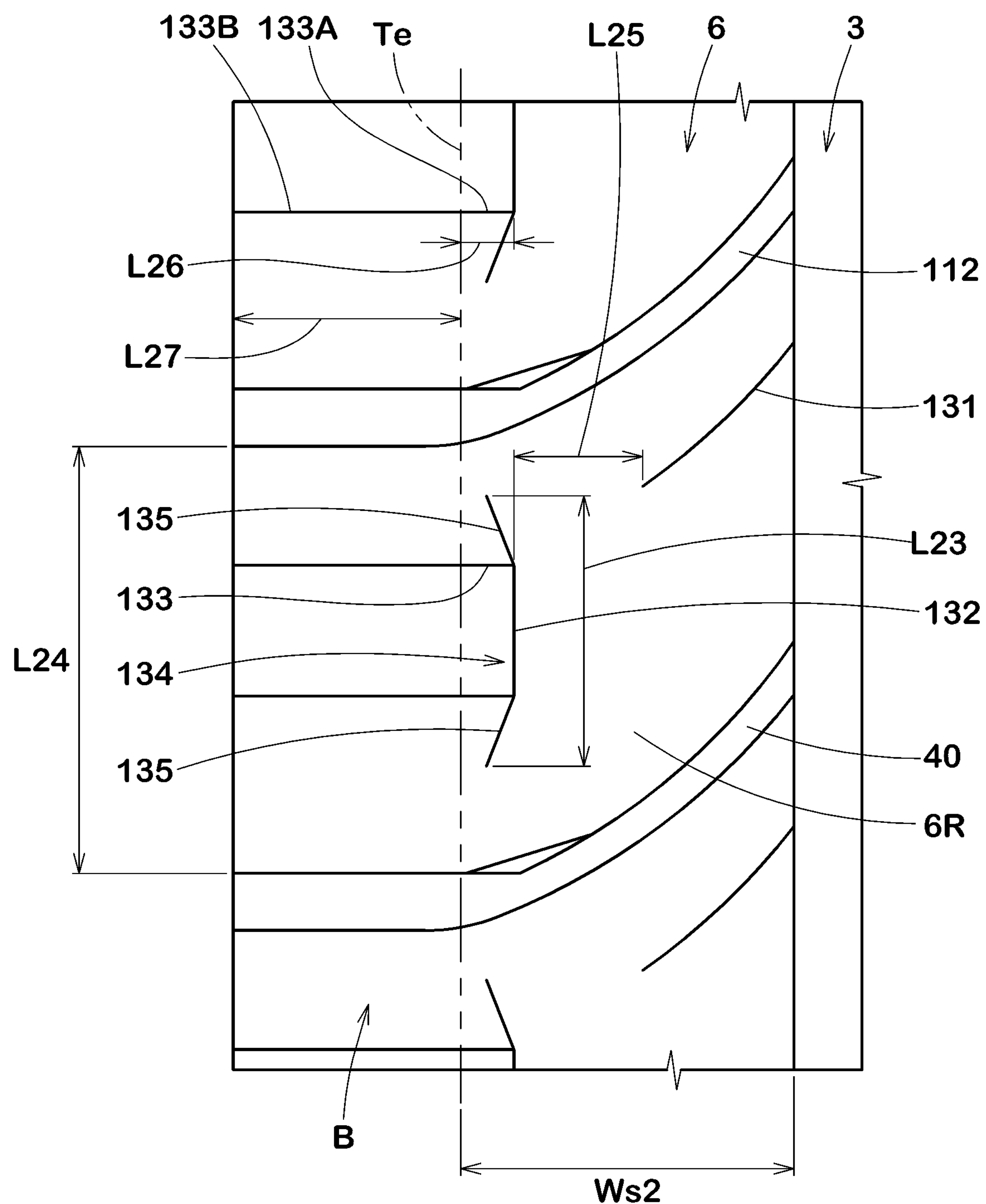
FIG. 16 is the plan view which is the same as FIGS. 9, 13 and 15 but differently provided with reference signs.

FIG. 16 is a plan view of a part of the shoulder land region 6.

In the present embodiment, each of the shoulder land regions 6 is further provided with shoulder inclined sipes 131, shoulder longitudinal sipes 132 and shoulder lateral sipes 133.

Here, the term "sipe" means a very narrow groove having a groove width less than 1.5 mm inclusive of a cut having no substantial width.

The term "groove" as used for the circumferential groove, lateral groove and auxiliary groove in this specification means a relatively wide groove having a groove width of 1.5 mm or more.

The shoulder inclined sipe 131 in the present embodiment extends from the shoulder circumferential groove 3 toward the outside in the tire axial direction and terminates within the shoulder block 6R.

The shoulder inclined sipe 131 in this example extends in parallel with the second portion 112 of the shoulder lateral groove 40.

Such shoulder inclined sipe 131 enhances wet performance.

The shoulder longitudinal sipe 132 in the present embodiment is composed of a main portion 134 extending in substantially parallel with the tire circumferential direction within the shoulder land region 6, and a pair of sub portions 135 respectively extending from both ends of the main portion 134, in oblique directions, away from the main portion 134 in the tire circumferential direction.

The sub portions 135 in this example are terminated within the shoulder block 6R without extending beyond the tread edge Te.

Here, the expression "substantially parallel with the tire circumferential direction" means that the angle with respect to the tire circumferential direction is in a range from 0 to 20 degrees.

Such shoulder longitudinal sipes 132 reduce the rigidity of the shoulder land region 6 near the tread edge Te, thereby reducing the self-aligning torque power (SATP). As a result, the equivalent cornering power (equivalent CP) of the tire as a whole is increased, and deterioration of steering stability performance is suppressed.

The equivalent CP is a value obtained by dividing the cornering power by SATP.

The SATP is a self-aligning torque (SAT) when the running tire 1 is given a slip angle of 1 degree.

The SAT is given by the sum of the braking force and driving force in the tire circumferential direction in the tread contact patch.

It is preferable that, as shown in FIG. 16, the length L23 in the tire circumferential direction of the shoulder longitudinal sipe 132 is not less than 50% of the distance L24 in the tire circumferential direction between the shoulder lateral grooves 40 adjacent to each other in the tire circumferential direction.

Thereby, the above-mentioned function is effectively exerted.

More specifically, the length L23 of the shoulder longitudinal sipe 132 is preferably not less than 55%, more preferably not less than 60%, but preferably not more than 75%, more preferably not more than 70% of the distance L24 between the shoulder lateral grooves 40.

Thereby, the decrease in the rigidity in the tire axial direction of the shoulder land region 6 is suppressed, and the steering stability performance is more sufficiently maintained.

The shortest distance L25 in the tire axial direction between the shoulder longitudinal sipe 132 and the shoulder inclined sipe 131 is preferably not less than 10%, more preferably not less than 15%, but preferably not more than 30%, more preferably not more than 25% of the axial width Ws2 of the shoulder land region 6.

The shoulder lateral sipe 133 in the present embodiment extends axially outwardly from the shoulder longitudinal sipe 132.

The shoulder lateral sipe 133 in this example extends from the shoulder land region 6 beyond the tread edge Te into the buttress region B.

The shoulder lateral sipe 133 in this example extends in parallel with the tire axial direction.

In this example, two shoulder lateral sipes 133 extend from one shoulder longitudinal sipe 132.

The two shoulder lateral sipe 133 extend from the respective connect positions between the main portion 134 and the two sub portions 135 of the shoulder longitudinal sipe 132.

The shoulder lateral sipe 133 in the present embodiment is composed of an inner portion 133A located in the shoulder land region 6, and an outer portion 133B located in the buttress region B.

The axial length L26 of the inner portion 133A is smaller than the axial length L27 of the outer portion 133B.

The axial length L26 of the inner portion 133A is preferably not less than 15%, more preferably not less than 20%, but preferably not more than 35%, more preferably not more than 30% of the axial length L27 of the outer portion 133B.

Figure 17:
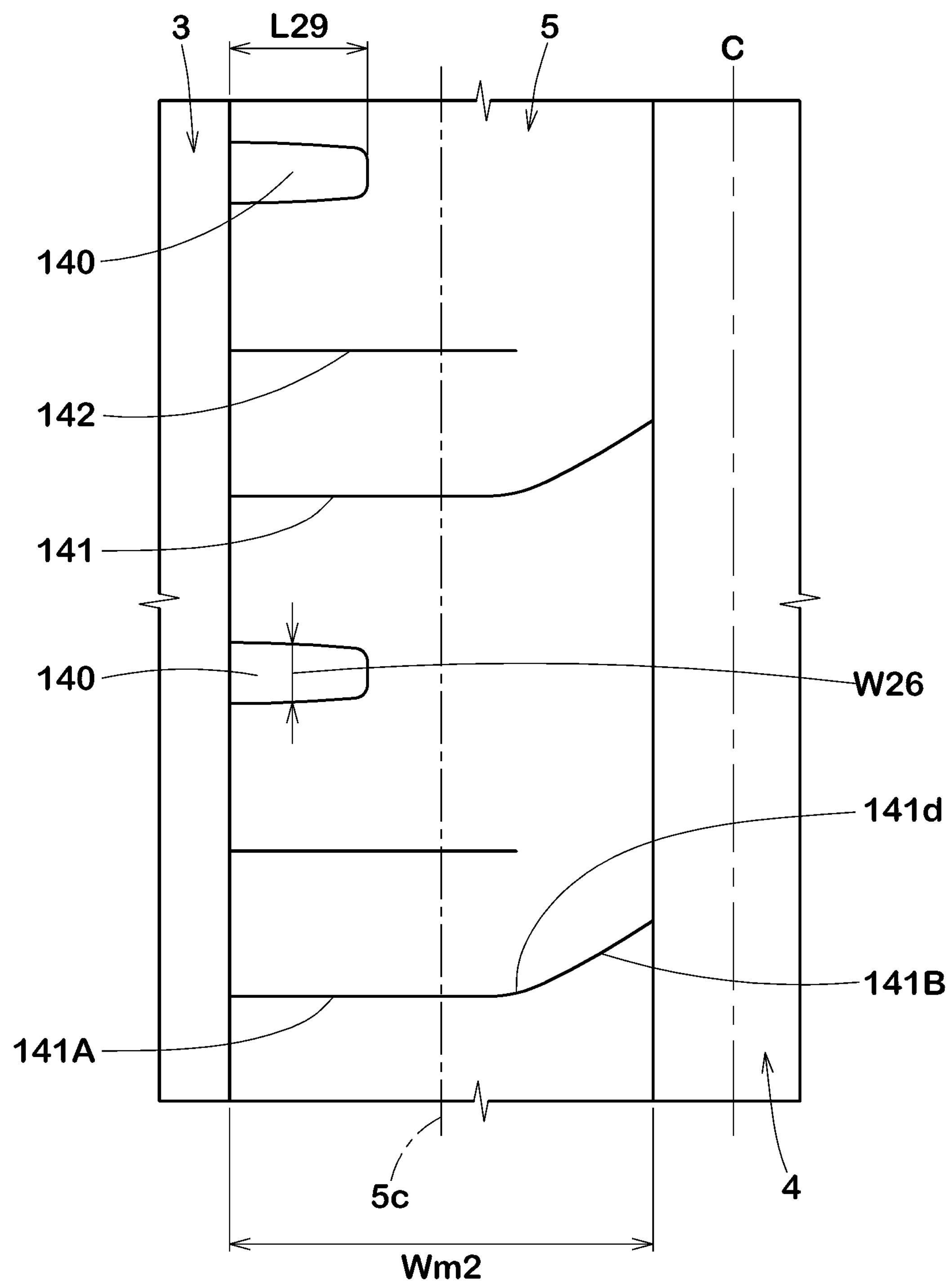
FIG. 17 is a plan view of a part of a middle land region of the tire according to the second mode.

FIG. 17 is a plan view of a part of the middle land region 5 shown in FIG. 12. As shown, each of the middle land regions 5 is provided with middle auxiliary grooves 140, first middle sipes 141 extending across the entire axial width of the middle land region 5, and second middle sipes 142 terminated within the middle land region 5.

In the present embodiment, between every two of the middle auxiliary grooves 140 adjacent to each other in the tire circumferential direction, one of the first middle sipes 141 and one of the second middle sipes 142 are disposed.

The middle auxiliary groove 140 in the present embodiment extends axially inwardly from the shoulder circumferential groove 3 and terminates within the middle land region 5.

The middle auxiliary groove 140 in this example extends in substantially parallel with the tire axial direction.

Here, the expression "substantially parallel with the tire axial direction" means that the angle with respect to the tire axial direction is in a range from 0 to 20 degrees.

The middle auxiliary groove 140 in this example is terminated at a position axially outside the middle position 5*c* in the tire axial direction of the middle land region 5.

Such middle auxiliary grooves 140 suppress an excessive decrease in the rigidity of the middle land region 5.

The axial length L29 of the middle auxiliary groove 140 is preferably not less than 20%, more preferably not less than 25%, but preferably not more than 40%, more preferably not more than 35% of the axial width Wm2 of the middle land region 5.

The groove width W26 of the middle auxiliary groove 140 is continuously increased toward the outside in the tire axial direction. The maximum of the groove width W26 of the middle auxiliary groove 140 is preferably not less than 5%, more preferably not less than 10%, but preferably not more than 25%, more preferably not more than 20% of the axial width Wm2 of the middle land region 5.

Such middle auxiliary groove 140 can smoothly discharge the water in the groove to the shoulder circumferential groove 3.

The first middle sipe 141 in this example is composed of an axial portion 141A extending in parallel with the tire axial direction, and an inclined portion 141B having a larger inclination angle with respect to the tire axial direction than the axial portion 141A.

The axial portion 141A extends axially inwardly from the shoulder circumferential groove 3.

The axial portion 141A in this example extends straight.

The axial portion 141A in this example extends axially inwardly from the shoulder circumferential groove 3 beyond the middle position 5*c* of the middle land region 5.

The inclined portion 141B extends from the axial portion 141A.

The inclined portion 141B is located on the tire equator C side of the axial portion 141A.

The inclined portion 141B in this example extends to the middle circumferential groove 4.

The inclined portion 141B in the present embodiment comprises an arcuate portion 141*d* connected to the axial portion 141A.

The arcuate portions 141*d* are curved convexly toward one side in the tire circumferential direction (lower side in the middle land region 5 shown in FIG. 17). Such arcuate portions 141*d* suppress an excessive decrease in the rigidity of the middle land region 5.

The second middle sipes 142 in the present embodiment extend axially inwardly from the shoulder circumferential groove 3 and terminate within the middle land region 5.

The second middle sipes 142 in this example each extend in parallel with the tire axial direction.

The second middle sipes 142 in the present embodiment are terminated on the tire equator C side of the middle position 5*c* of the middle land region 5.

While detailed description has been made of preferable embodiments of the present disclosure, the present disclosure can be embodied in various forms without being limited to the illustrated embodiments.

Comparison Tests

<First Mode>

Based on the tread pattern shown in FIG. 4 according to the first mode, pneumatic tires of size 205/65R16 (rim size 16x6.5J) were experimentally manufactured as test tires (Comparative example tire Ref1-1 and Working example tires Ex1-1 to Ex1-6) and tested for the steering stability performance, wet performance and snow performance as follows.

Specifications of the test tires are shown in Table 1.

<Steering Stability Performance, Wet Performance and Snow Performance>

The test tires were mounted on a test vehicle (2000 cc commercial vehicle, front tire pressure 390 kPa, rear tire pressure 420 kPa). The test vehicle was run on a dry asphalt road surface and a wet asphalt road surface of a test course and a snow covered road surface of a test course, and based on the stability and maneuverability of the test vehicle during running, the steering stability performance, wet performance and snow performance were evaluated by the test driver.

The results are indicated in Table 1 by an index based on the working example Ex1-1 being 100, wherein the larger number is the better.

TABLE 1

| Tire | Ref 1-1 | Ex 1-1 | Ex 1-2 | Ex 1-3 | Ex 1-4 | Ex 1-5 | Ex 1-6 |
|---|---|---|---|---|---|---|---|
| (P)resence or (A)bsence of third side wall | A | P | P | P | P | P | P |
| L2 (mm) | — | 3 | 3 | 3 | 5 | 5 | 1 |
| connect point *1 | — | 30 | 30 | 30 | 40 | 40 | 40 |
| W3/W4 | 1.25 | 1.0 | 1.5 | 1.5 | 1.25 | 1.25 | 1.25 |
| β (deg.) | 65 | 50 | 50 | 80 | 65 | 65 | 65 |
| L9/L10 (%) | 60 | 60 | 60 | 60 | 60 | 100 | 60 |
| θ1,θ2 (deg.) | 90 | 80 | 100 | 100 | 90 | 90 | 90 |
| Steering stability | 95 | 100 | 95 | 95 | 100 | 105 | 95 |
| Wet performance | 90 | 100 | 115 | 115 | 125 | 110 | 100 |
| Snow performance | 90 | 100 | 115 | 115 | 120 | 115 | 105 |
| Total score | 275 | 300 | 325 | 325 | 345 | 330 | 300 |

*1 The ratio (%) of the radial distance between the block tread 9 and the connect point 29 between the first edge 22 and the second edge 23 of the third side wall 19 to the maximum depth of the middle lateral groove.

From the test results, it was confirmed that the tires according to the first mode exhibited excellent wet performance and snow performance, while suppressing the deterioration of the steering stability performance.

<Second Mode>

Based on the tread pattern shown in FIG. 12 according to the second mode, pneumatic tires of size 205/65R16 (rim size 16x6.5J) were experimentally manufactured as test tires (Comparative example tire Ref2-1 and Working example tires Ex2-1 to Ex2-9) and tested for the wet performance, steering stability performance and uneven wear resistance performance as follows. Specifications of the test tires are shown in Table 2.

<Wet Performance, Steering Stability Performance and Uneven Wear Resistance Performance>

The test tires were mounted on a test vehicle (2000 cc commercial vehicle, front tire pressure 390 kPa, rear tire pressure 420 kPa). The test vehicle was run on a wet asphalt road surface and a dry asphalt road surface of a test course, and based on the stability and maneuverability of the test vehicle during running, the wet performance and the steering stability performance were evaluated by the test driver. Further, after running on the dry asphalt road surface, the occurrence of uneven wear of the tread portion was checked and the uneven wear resistance performance was evaluated by the test driver.

The test results are indicated in Table 2 by an index based on the working example Ex2-1 being 100, wherein the larger number is better.

TABLE 2

| Tire | Ref 2-1 | Ex 2-1 | Ex 2-2 | Ex 2-3 | Ex 2-4 | Ex 2-5 | Ex 2-6 | Ex 2-7 | Ex 2-8 | Ex 2-9 |
|---|---|---|---|---|---|---|---|---|---|---|
| (P)resence or (A)bsence of third side wall | A | P | P | P | P | P | P | P | P | P |
| θ21 (deg.) | 30 | 30 | 40 | 40 | 40 | 40 | 80 | 20 | 20 | 20 |
| W23 (mm) | 6 | 3.5 | 6 | 6 | 6 | 2 | 3.5 | 3.5 | 3.5 | 3.5 |
| W24 (mm) | 2 | 2.5 | 2 | 2 | 2 | 6 | 2.5 | 2.5 | 2.5 | 2.5 |

TABLE 2-continued

| Tire | Ref 2-1 | Ex 2-1 | Ex 2-2 | Ex 2-3 | Ex 2-4 | Ex 2-5 | Ex 2-6 | Ex 2-7 | Ex 2-8 | Ex 2-9 |
|---|---|---|---|---|---|---|---|---|---|---|
| L23/L24 (%) | 60 | 60 | 60 | 60 | 100 | 100 | 100 | 100 | 60 | 60 |
| shoulder lateral sipes *2 | 2 | 2 | 2 | 2 | 2 | 2 | 2 | 2 | 1 | 2 |
| L29/Wm2 (%) | 30 | 30 | 30 | 30 | 30 | 30 | 30 | 30 | 30 | 100 |
| Wet performance | 90 | 100 | 120 | 120 | 105 | 95 | 105 | 100 | 100 | 110 |
| Steering stability | 100 | 100 | 110 | 110 | 105 | 105 | 105 | 105 | 100 | 100 |
| Uneven wear resistance | 95 | 100 | 95 | 105 | 95 | 105 | 95 | 95 | 105 | 95 |
| Total score | 285 | 300 | 325 | 335 | 305 | 305 | 305 | 300 | 305 | 305 |

*2 The number of the shoulder lateral sipes 133 connected to one shoulder longitudinal sipe 132.

From the test results, it was confirmed that the tires according to the second mode exhibited excellent wet performance, while suppressing the deterioration of the steering stability performance and the uneven wear resistance performance.

The present disclosure at least includes the following.

Present disclosure 1: A tire comprising:

a tread portion comprising a middle land region defined between a middle circumferential groove and an axially outer shoulder circumferential groove, the middle land region circumferentially divided by middle lateral grooves into a plurality of middle blocks each having a block side wall and a block tread, and each of the middle lateral grooves comprising a first portion extending from the shoulder circumferential groove, a second portion located on the middle circumferential groove side and inclined with respect to the first portion, and a connect portion at which the first portion and the second portion are connected with each other, so that each of the middle blocks is provided with a convex corner portion which is convex toward the outside of the block at the connect portion, wherein in the convex corner portion, the block side wall comprises a first side wall extending along the first portion, a second side wall extending along the second portion, and a substantially triangular third side wall intersecting the first side wall, the second side wall and the block tread, and the third side wall terminates on the outside in the tire radial direction, of the groove bottom of the middle lateral groove.

Present disclosure 2: The tire according to Present disclosure 1, wherein the second portion of each of the middle lateral grooves extends from the middle circumferential groove.

Present disclosure 3: The tire according to Present disclosure 1 or 2, wherein the connect portion of each of the middle lateral grooves is located on the tire equator side of the middle position in the tire axial direction of the middle land region.

Present disclosure 4: The tire according to any one of Present disclosures 1 to 3, wherein the angle between the middle circumferential groove and the second portion of each of the middle lateral grooves is in a range from 50 to 80 degrees.

Present disclosure 5: The tire according to any one of Present disclosures 1 to 4, wherein, in each of the second portions of the middle lateral grooves, a groove width at the groove bottom is constant over the entire length of the second portion.

Present disclosure 6: A tire comprising:

a tread portion comprising a shoulder land region defined between a shoulder circumferential groove and a tread edge, the shoulder land region circumferentially divided by shoulder lateral grooves into a plurality of shoulder blocks each having a block side wall and a block tread, each of the shoulder lateral grooves comprising a first portion extending axially inwardly from the tread edge, a second portion located on the shoulder circumferential groove side and inclined with respect to the first portion, and a connect portion at which the first portion and the second portion are connected with each other, so that each of the shoulder blocks is provided with a convex corner portion which is convex toward the outside of the block at the connect portion, wherein in the convex corner portion, the block side wall comprises a first side wall extending along the first portion, a second side wall extending along the second portion, and a substantially triangular third side wall intersecting the first side wall, the second side wall and the block tread, and the third side wall terminates on the outside in the tire radial direction, of the groove bottom of the shoulder lateral groove.

Present disclosure 7: The tire according to Present disclosure 6, wherein the second portion of each of the shoulder lateral grooves extends from the shoulder circumferential groove.

Present disclosure 8: The tire according to Present disclosure 6 or 7, wherein the connect portion of each of the shoulder lateral grooves is located axially outside the middle position in the tire axial direction of the shoulder land region.

Present disclosure 9: The tire according to any one of Present disclosures 6 to 8, wherein the angle between the shoulder circumferential groove and the second portion of each of the shoulder lateral grooves is in a range from 30 to 50 degrees.

Present disclosure 10 The tire according to any one of Present disclosures 6 to 9, wherein, in the convex corner portion of each of the shoulder blocks, the third side wall extends to the tread edge.

Present disclosure 11: The tire according to any one of Present disclosures 6 to 10, wherein the first portion of each of the shoulder lateral grooves extends axially outwardly beyond the tread edge.

Present disclosure 12: The tire according to any one of Present disclosures 1 to 11, wherein, in each of the convex corner portions, the third side wall has a radially outer edge which is a boundary with the block tread, a first edge which is a boundary with the first side wall, and a second edge which is a boundary with the second side wall, and the radially outer edge is longer than the first edge and the second edge.

Present disclosure 13: The tire according to any one of Present disclosures 1 to 5, wherein in the convex corner portion of each of the middle blocks, the third side wall has a radially outer edge which is a boundary with the block tread, a first edge which is a boundary with the first side wall, and a second edge which is a boundary with the second side wall, the radially outer edge is longer than the first edge and the second edge, and a connect point between the first edge and the second edge is located in a range from 30% to 50% of the maximum groove depth of the middle lateral groove adjacent to the convex corner portion.

Present disclosure 14: The tire according to Present disclosure 13, wherein the length of the radially outer edge is larger than the shortest distance between the connect point and the radially outer edge in the plan view of the tread portion.

Present disclosure 15: The tire according to Present disclosure 14, wherein the shortest distance is 3 to 7 mm.

Present disclosure 16: The tire according to Present disclosure 1, wherein in each of the middle lateral grooves, the groove width in the first portion is larger than the groove width in the second portion.

Present disclosure 17 The tire according to Present disclosure 6, wherein, in each of the shoulder lateral grooves, the groove width in the first portion is larger than the groove width in the second portion.

Present disclosure 18: The tire according to Present disclosure 1, wherein, in each of the middle lateral grooves, the angle of the first portion with respect to the tire axial direction is not more than 20 degrees.

Present disclosure 19: The tire according to Present disclosure 6, wherein, in each of the shoulder lateral grooves, the angle of the first portion with respect to the tire axial direction is not more than 20 degrees.

DESCRIPTION OF THE REFERENCE SIGNS

1 tire
5 middle land region
7 middle lateral groove
7*s* groove bottom
5*a* middle block
8 block side wall
9 block tread
11 first portion
12 second portion
13 connect portion
15 convex corner portion
17 first side wall
18 second side wall
19 third side wall

The invention claimed is:

1. A tire comprising:
a tread portion comprising a shoulder land region defined between a shoulder circumferential grove and a tread edge,
the shoulder land region circumferentially divided by shoulder lateral grooves into a plurality of shoulder blocks each having a block side wall and a block tread,
each of the shoulder lateral grooves comprising:
a first portion extending axially inwardly from the tread edge;
a second portion located on the shoulder circumferential groove side and inclined with respect to the first portion; and
a connect portion at which the first portion and the second portion are connected with each other, so that each of the shoulder blocks is provided with a convex corner portion which is convex toward the outside of the block at the connect portion
wherein
in the convex corner portion of each of the shoulder blocks,
the block side wall comprises:
a first side wall extending along the first portion;
a second side wall extending along the second portion; and
a substantially triangular third side wall intersecting the first side wall, the second side wall and the block tread,
the third side wall terminates on the outside in the tire radial direction, of a groove bottom of a respective one of the shoulder lateral grooves,
the first portion extends straight,
the second portion extends in an arc shape in a plan view of the tread portion so that an angle of the second portion with respect to the tire axial direction decreases continuously toward axially outside,
in each of the shoulder lateral grooves, an angle of the first portion with respect to the tire axial direction is 20 degrees or less,
the first portion extends axially outward from the shoulder land region to a buttress region demarcated axially outside of the tread edge,
the angle of the first portion in the buttress region is 0 degrees,
the connect portion of each of the shoulder lateral grooves is located axially outside a middle position in the tire axial direction of the shoulder land region,
the third side wall has a radially outer edge which is a boundary with the block tread of the each of the shoulder blocks, a first edge which is a boundary with the first side wall, a second edge which is a boundary with the second wide wall, and a connect point between the first edge and the second edge, and
a distance in the tire axial direction from the connect point to the tread edge is 4 mm or more and 6 mm or less.

2. The tire according to claim 1, wherein the second portion of each of the shoulder lateral grooves extends from the shoulder circumferential groove.

3. The tire according to claim 1, wherein
an angle between the shoulder circumferential groove and the second portion of each of the shoulder lateral grooves is in a range from 30 to 50 degrees, and
in each of the shoulder lateral grooves, the angle of the first portion with respect to the tire axial direction is not more than 20 degrees.

4. The tire according to claim 1, wherein in the convex corner portion of each of the shoulder blocks, the third side wall extends to the tread edge.

5. The tire according to claim 1, wherein in each of the shoulder lateral grooves, a groove width in the first portion is larger than a groove width in the second portion.

6. A tire comprising:
a tread portion comprising a shoulder land region defined between a shoulder circumferential grove and a tread edge,
the shoulder land region circumferentially divided by shoulder lateral grooves into a plurality of shoulder blocks each having a block side wall and a block tread,
each of the shoulder lateral grooves comprising:
a first portion extending axially inwardly from the tread edge;
a second portion located on the shoulder circumferential groove side and inclined with respect to the first portion; and
a connect portion at which the first portion and the second portion are connected with each other, so that each of the shoulder blocks is provided with a convex corner portion which is convex toward the outside of the block at the connect portion wherein in the convex corner portion of each of the shoulder blocks, the block side wall comprises a first side wall extending along the first portion;

a second side wall extending along the second portion; and a substantially triangular third side wall intersecting the first side wall, the second side wall and the block tread, the third side wall terminates on the outside in the tire radial direction, of a groove bottom of a respective one of the shoulder lateral grooves, in the convex corner portion of each of the shoulder blocks, the third side wall extends to the tread edge, the third side wall has a radially outer edge which is a boundary with the block tread of the each of the shoulder blocks, a first edge which is a boundary with the first side wall, a second edge which is a boundary with the second side wall, a connect point which is positioned at the tread edge, between the radially outer edge and the first edge, and another connect point between the first edge and the second edge, a length of the radially outer edge along a longitudinal direction thereof is 25%or more and 45% or less of an axial width of the shoulder land region, each of the shoulder blocks has an axial width smaller than a distance in the tire circumferential direction between the shoulder lateral grooves adjacent to each other in the tire circumferential direction, and a distance in the tire axial direction from the another connect point to the tread edge is 4 mm or more and 6 mm or less.

7. The tire according to claim 6, wherein the length of the radially outer edge is larger than a shortest distance between the another connect point and the radically outer edge in a plan view of the tread portion, and the shortest distance is 3 mm or more and 7 mm or less.

* * * * *